US008105151B2

(12) United States Patent
Caputo et al.

(10) Patent No.: US 8,105,151 B2
(45) Date of Patent: Jan. 31, 2012

(54) GAMING SYSTEM, GAMING DEVICE AND METHOD FOR PROVIDING CASCADING SYMBOLS WITH WILD FEATURES

(75) Inventors: Scott A. Caputo, Santa Clara, CA (US); Brian F. Saunders, Sunnyvale, CA (US)

(73) Assignee: IGT, Reno, NV (US)

( * ) Notice: Subject to any disclaimer, the term of this patent is extended or adjusted under 35 U.S.C. 154(b) by 300 days.

(21) Appl. No.: 12/166,462

(22) Filed: Jul. 2, 2008

(65) Prior Publication Data

US 2010/0004050 A1 Jan. 7, 2010

(51) Int. Cl.
*A63F 13/00* (2006.01)

(52) U.S. Cl. ........................................................ 463/21

(58) Field of Classification Search ..................... 463/21
See application file for complete search history.

(56) References Cited

U.S. PATENT DOCUMENTS 1,978,395 A 10/1934 Groetchen
3,420,525 A 1/1969 Waders
3,642,287 A 2/1972 Lally et al.
3,735,987 A 5/1973 Ohki
4,099,722 A 7/1978 Rodesch et al.
4,198,052 A 4/1980 Gauselmann
4,200,291 A 4/1980 Hooker
4,326,351 A 4/1982 Heywood et al.
4,357,567 A 11/1982 Rock
4,636,951 A 1/1987 Harlick
4,695,053 A 9/1987 Vazquez, Jr. et al.
4,790,537 A 12/1988 Smyth et al.
4,826,169 A 5/1989 Bessho et al.
4,874,173 A 10/1989 Kishishita
5,152,529 A 10/1992 Okada
5,205,555 A 4/1993 Hamano
RE34,244 E 5/1993 Hagiwara
5,308,065 A 5/1994 Bridgeman et al.

(Continued)

FOREIGN PATENT DOCUMENTS

AU 710015 B2 9/1997

(Continued)

OTHER PUBLICATIONS

Brokopp, John, "A Study in Slot Machine Research and Development," published at www.casinocitytimes.com on Nov. 30, 2005.

(Continued)

*Primary Examiner* — Melba Bumgarner
*Assistant Examiner* — Thomas H Henry
(74) *Attorney, Agent, or Firm* — K&L Gates LLP

(57) ABSTRACT

A cascading symbol game includes designated symbols such as wild symbols. In the cascading symbol game, a gaming device generates and displays a symbol from a plurality of symbols for each of a plurality of symbol positions. The gaming device removes at least one symbol from at least one of the plurality of symbol positions. The gaming device repositions at least one displayed symbol to another one of the symbol positions to create at least one empty symbol position. If a designated event occurred, the gaming device generates and displays at least one designated symbol, such as a wild symbol, in the at least one empty symbol position, wherein the at least one designated wild symbol is generated independent of the plurality of symbols. The gaming device displays any award associated with any winning symbol combination formed from the displayed symbols.

41 Claims, 13 Drawing Sheets

U.S. PATENT DOCUMENTS 5,332,228 A 7/1994 Schultz
5,364,100 A 11/1994 Ludlow et al.
5,395,111 A 3/1995 Inoue
5,423,539 A 6/1995 Nagao
5,431,408 A 7/1995 Adams
5,449,173 A 9/1995 Thomas et al.
5,564,700 A 10/1996 Celona
5,584,764 A 12/1996 Inoue
5,624,119 A 4/1997 Leake
5,664,998 A 9/1997 Seelig et al.
5,704,835 A 1/1998 Dietz
5,720,662 A 2/1998 Holmes et al.
5,752,881 A 5/1998 Inoue
5,769,716 A 6/1998 Saffari et al.
5,772,506 A 6/1998 Marks et al.
5,807,172 A 9/1998 Piechowiak
5,813,911 A 9/1998 Margolin
5,823,873 A 10/1998 Moody
5,833,536 A 11/1998 Davids et al.
5,833,537 A 11/1998 Barrie
5,882,260 A 3/1999 Marks et al.
5,951,397 A 9/1999 Dickinson
5,980,384 A 11/1999 Barrie
5,984,782 A 11/1999 Innoue
5,997,400 A 12/1999 Seelig et al.
5,997,401 A 12/1999 Crawford
6,033,307 A 3/2000 Vancura
6,056,642 A 5/2000 Bennett
6,059,289 A 5/2000 Vancura
6,086,066 A 7/2000 Takeuchi et al.
6,089,976 A 7/2000 Schneider et al.
6,089,977 A 7/2000 Bennett
6,117,013 A 9/2000 Eiba
6,120,031 A 9/2000 Adams
6,120,376 A 9/2000 Cherry
6,120,377 A 9/2000 McGinnis et al.
6,139,124 A 10/2000 Baerlocher et al.
6,142,875 A 11/2000 Kodachi et al.
6,159,095 A 12/2000 Frohm et al.
6,159,096 A 12/2000 Yoseloff
6,174,235 B1 1/2001 Walker et al.
6,190,254 B1 2/2001 Bennett
6,203,009 B1 3/2001 Sines et al.
6,220,959 B1 4/2001 Holmes, Jr. et al.
6,224,484 B1 5/2001 Okuda et al.
6,227,971 B1 5/2001 Weiss
6,241,607 B1 6/2001 Payne et al.
6,251,013 B1 6/2001 Bennett
6,254,481 B1 7/2001 Jaffe
6,270,411 B1 8/2001 Gura et al.
6,270,412 B1 8/2001 Crawford et al.
6,290,600 B1 9/2001 Glasson
6,299,165 B1 10/2001 Nagano
6,299,170 B1 10/2001 Yoseloff
6,302,429 B1 10/2001 Friedrich
6,305,686 B1 10/2001 Perrie et al.
6,311,976 B1 11/2001 Yoseloff et al.
6,315,660 B1 11/2001 DeMar et al.
6,315,663 B1 11/2001 Sakamoto
6,318,721 B1 11/2001 Randall et al.
6,319,124 B1 11/2001 Baerlocher et al.
6,322,078 B1 11/2001 Adams
6,347,996 B1 2/2002 Gilmore et al.
6,358,144 B1 3/2002 Kaddlic et al.
6,394,902 B1 5/2002 Glavich et al.
6,398,644 B1 6/2002 Perrie et al.
6,409,602 B1 6/2002 Wiltshire et al.
6,413,161 B1 7/2002 Baerlocher et al.
6,413,162 B1 7/2002 Baerlocher et al.
6,419,579 B1 7/2002 Bennett
6,439,993 B1 8/2002 O'Halloran
6,464,581 B1 10/2002 Yoseloff et al.
6,481,713 B2 11/2002 Perrie et al.
6,494,454 B2 12/2002 Adams
6,517,432 B1 2/2003 Jaffe
6,575,830 B2 6/2003 Baerlocher et al.
6,585,591 B1 7/2003 Baerlocher et al.
6,589,114 B2 7/2003 Rose
6,604,740 B1 8/2003 Singer et al.
6,616,142 B2 9/2003 Adams
6,632,140 B2 10/2003 Berman et al.
6,634,945 B2 10/2003 Glavich et al.
6,641,477 B1 11/2003 Dietz
6,643,943 B2 11/2003 Dall'Aglio et al.
6,659,864 B2 12/2003 McGahn et al.
6,666,767 B1 12/2003 Dayan
6,676,512 B2 1/2004 Fong et al.
6,695,696 B1 2/2004 Kaminkow
6,702,671 B2 3/2004 Tarantino
6,712,693 B1 3/2004 Hettinger
6,733,386 B2 5/2004 Cuddy et al.
6,780,109 B2 8/2004 Kaminkow
6,802,775 B2 10/2004 Baerlocher et al.
6,805,349 B2 10/2004 Baerlocher et al.
6,832,957 B2 12/2004 Falconer
6,837,788 B2 1/2005 Cannon
6,855,054 B2 2/2005 White et al.
6,866,583 B2 3/2005 Glavich et al.
6,875,106 B2 4/2005 Weiss et al.
6,896,617 B2 5/2005 Daly
6,905,406 B2 6/2005 Kaminkow et al.
6,910,962 B2 6/2005 Marks et al.
6,913,533 B2 7/2005 Cuddy et al.
6,921,335 B2 * 7/2005 Rodgers et al. ................. 463/30
6,942,571 B1 9/2005 McAllister et al.
6,960,133 B1 11/2005 Marks et al.
6,971,955 B2 12/2005 Baerlocher et al.
6,979,263 B2 12/2005 Baerlocher et al.
6,986,710 B2 1/2006 Baerlocher et al.
6,991,538 B2 1/2006 Cannon
6,997,804 B2 2/2006 Berman
7,048,275 B2 5/2006 Adams
7,052,395 B2 5/2006 Glavich et al.
7,056,213 B2 6/2006 Ching et al.
7,070,502 B1 7/2006 Bussick et al.
7,074,127 B2 7/2006 Cuddy et al.
7,077,745 B2 7/2006 Gomez et al.
7,090,580 B2 8/2006 Rodgers et al.
7,094,148 B2 8/2006 Baerlocher et al.
7,104,886 B2 9/2006 Baerlocher et al.
7,108,602 B2 9/2006 Daly
7,137,888 B2 11/2006 Glavich et al.
7,144,322 B2 12/2006 Gomez et al.
7,153,205 B2 12/2006 Baerlocher
7,160,186 B2 1/2007 Cuddy et al.
7,169,042 B2 1/2007 Muir et al.
7,195,559 B2 3/2007 Gilmore et al.
7,226,359 B2 6/2007 Bussick et al.
7,236,113 B1 6/2007 Wang
7,252,591 B2 8/2007 Van Asdale
7,252,592 B2 8/2007 Rodgers et al.
7,294,058 B1 11/2007 Slomiany et al.
7,331,862 B2 2/2008 Rodgers et al.
7,331,866 B2 2/2008 Rodgers et al.
7,357,713 B2 4/2008 Marks et al.
7,371,169 B2 5/2008 Baerlocher
7,371,170 B2 5/2008 Cregan et al.
7,396,279 B2 7/2008 Berman et al.
7,399,225 B2 7/2008 Kaminkow
7,442,123 B2 10/2008 Brill et al.
2002/0010017 A1 1/2002 Bennett
2002/0068623 A1 6/2002 Gauselmann
2002/0077165 A1 6/2002 Bansemer et al.
2003/0045345 A1 3/2003 Bermin
2003/0054874 A1 3/2003 Kaminkow
2003/0057645 A1 3/2003 Baerlocher et al.
2003/0060267 A1 3/2003 Glavich et al.
2003/0100356 A1 5/2003 Brown et al.
2003/0157981 A1 * 8/2003 Marks et al. .................... 463/20
2003/0203753 A1 10/2003 Muir et al.
2003/0207710 A1 11/2003 Rodgers et al.
2004/0012145 A1 1/2004 Inoue
2004/0014516 A1 1/2004 Inoue
2004/0014517 A1 1/2004 Inoue
2004/0018866 A1 1/2004 Inoue
2004/0026854 A1 2/2004 Inoue
2004/0033827 A1 2/2004 Gilmore et al.

| | | | |
|---|---|---|---|
| 2004/0033829 A1 | 2/2004 | Pacey et al. |
| 2004/0036218 A1 | 2/2004 | Inoue |
| 2004/0038726 A1 | 2/2004 | Inoue |
| 2004/0043809 A1 | 3/2004 | Gomez et al. |
| 2004/0048651 A1 | 3/2004 | Vorias et al. |
| 2004/0053669 A1 | 3/2004 | Gerrard et al. |
| 2004/0053672 A1 | 3/2004 | Baerlocher |
| 2004/0053676 A1 | 3/2004 | Rodgers |
| 2004/0072612 A1 | 4/2004 | Rodgers et al. |
| 2004/0097280 A1 | 5/2004 | Gauselmann |
| 2004/0102236 A1 | 5/2004 | Suda et al. |
| 2004/0137982 A1 | 7/2004 | Cuddy et al. |
| 2004/0147306 A1 | 7/2004 | Randall et al. |
| 2005/0020344 A1 | 1/2005 | Kaminkow |
| 2005/0049035 A1 | 3/2005 | Baerlocher et al. |
| 2005/0054429 A1 | 3/2005 | Baerlocher et al. |
| 2005/0059446 A1 | 3/2005 | Kaminkow |
| 2005/0064924 A1 | 3/2005 | Glavich et al. |
| 2005/0070354 A1 | 3/2005 | Baerlocher et al. |
| 2005/0101380 A1 | 5/2005 | Glavich et al. |
| 2005/0119403 A1 | 6/2005 | St. Clair |
| 2005/0148381 A1 | 7/2005 | Marks et al. |
| 2005/0148384 A1 | 7/2005 | Marks et al. |
| 2005/0227754 A1 | 10/2005 | Kaminkow et al. |
| 2005/0282620 A1 | 12/2005 | Marks et al. |
| 2005/0288094 A1 | 12/2005 | Marks et al. |
| 2006/0030392 A1 | 2/2006 | Rodgers et al. |
| 2006/0068875 A1 | 3/2006 | Cregan et al. |
| 2006/0068882 A1 | 3/2006 | Baerlocher et al. |
| 2006/0068884 A1 | 3/2006 | Baerlocher et al. |
| 2006/0068885 A1 | 3/2006 | Cregan et al. |
| 2006/0073876 A1 | 4/2006 | Cuddy |
| 2006/0084494 A1 | 4/2006 | Belger et al. |
| 2006/0089191 A1 | 4/2006 | Singer et al. |
| 2006/0172795 A1 | 8/2006 | Bussick et al. |
| 2006/0199636 A1 | 9/2006 | Ching et al. |
| 2006/0199637 A1 | 9/2006 | Ching et al. |
| 2006/0264254 A1 | 11/2006 | Aoki |
| 2007/0010316 A1 | 1/2007 | Baerlocher et al. |
| 2007/0021188 A1 | 1/2007 | Rodgers et al. |
| 2007/0060248 A1 | 3/2007 | Rodgers et al. |
| 2007/0060294 A1 | 3/2007 | Cuddy et al. |
| 2007/0087812 A1 | 4/2007 | Glavich et al. |
| 2007/0287523 A1 | 12/2007 | Esses et al. |
| 2008/0051174 A1 | 2/2008 | Fiden |
| 2008/0090655 A1 | 4/2008 | Marks |
| 2008/0102931 A1 | 5/2008 | Marks |
| 2008/0108411 A1 | 5/2008 | Jensen et al. |
| 2008/0113765 A1 | 5/2008 | DeWaal |
| 2008/0132320 A1 | 6/2008 | Rodgers |
| 2008/0139298 A1 | 6/2008 | Rodgers et al. |
| 2008/0200232 A1 | 8/2008 | Baerlocher et al. |

FOREIGN PATENT DOCUMENTS

| | | |
|---|---|---|
| AU | 722969 | 6/1998 |
| AU | 199917318 A1 | 9/1999 |
| AU | 755879 | 2/2001 |
| EP | 0 058 488 | 8/1982 |
| EP | 0 060 019 | 9/1982 |
| EP | 0 874 337 | 10/1998 |
| EP | 0 981 119 | 2/2000 |
| EP | 0 984 408 | 3/2000 |
| EP | 1 063 622 | 12/2000 |
| EP | 1 184 822 | 3/2002 |
| EP | 1 205 894 | 5/2002 |
| EP | 1 422 673 | 5/2004 |
| EP | 1 513 117 | 3/2005 |
| GB | 1 454 046 | 10/1976 |
| GB | 2 062 922 | 5/1981 |
| GB | 2 106 293 | 9/1981 |
| GB | 2 081 952 | 2/1982 |
| GB | 2 090 690 | 7/1982 |
| GB | 2 096 376 | 10/1982 |
| GB | 2 097 160 | 10/1982 |
| GB | 2 100 905 | 1/1983 |
| GB | 2 105 891 | 3/1983 |
| GB | 2 106 295 | 4/1983 |
| GB | 2 113 881 | 8/1983 |
| GB | 2 117 155 | 10/1983 |
| GB | 2 137 392 | 10/1984 |
| GB | 2 161 008 | 1/1986 |
| GB | 2 165 385 | 4/1986 |
| GB | 2 170 643 | 8/1986 |
| GB | 2 180 087 A | 3/1987 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 225 889 | 6/1990 |
| GB | 2 226 436 | 6/1990 |
| GB | 2 242 300 | 9/1991 |
| GB | 2 262 642 | 6/1993 |
| GB | 2 322 217 A | 8/1998 |
| GB | 2 335 524 A | 9/1999 |
| GB | 2 372 132 | 2/2001 |
| GB | 2 393 555 A | 3/2004 |
| WO | WO 97/32285 | 9/1997 |
| WO | WO 98/20949 | 5/1998 |
| WO | WO 00/30727 | 6/2000 |
| WO | WO 00/32286 | 6/2000 |
| WO | WO 00/66235 | 11/2000 |
| WO | WO 00/76606 | 12/2000 |
| WO | WO 01/26019 | 4/2001 |
| WO | WO 03/026756 | 4/2003 |
| WO | WO 2004/025584 | 3/2004 |
| WO | WO 2005/028043 | 3/2005 |
| WO | WO 2006/076294 | 7/2006 |
| WO | WO 2007/002935 | 1/2007 |
| WO | WO 2007/084766 | 7/2007 |
| WO | WO 2007/130443 | 11/2007 |
| WO | WO 2007/130444 | 11/2007 |

OTHER PUBLICATIONS

All That Glitters website, written by WMS Gaming, published on or before Nov. 2007.

"Barn Yard by Aristocrat," article written by Strictly Slots, published Mar. 2002.

Bejeweled Web site, written by PopCap Games, http://www.popcap.com, published prior to Sep. 9, 2005.

Black Swan Paytable Display, written by IGT, published prior to 2001.

Break the Spell Advertisement written by Atronic Casino Technology, Ltd., published prior to Jan. 1, 2000.

"Cash Chameleon," article written by Strictly Slots/Aristocrat Leisure Industries, PTY Ltd., published in Apr. 2001.

Catch a Wave Advertisement written by IGT, published in Dec. 2000.

Cossack Dancer Advertisement written by Olympic Video Gaming, published prior to 2002.

"Expanding Symbol," Description, written by IGT, published Sep. 1999.

"Gaming Machine with Animating Symbols," Description, written by IGT, published Jan. 2000.

"Symbol Feature in Australian UFO Gaming Machine," Description written by Barcrest, Ltd., published 1995.

"Traveling Symbols," Description, written by IGT, published Sep. 1999.

Double Diamond Line Advertisement written by Bally Gaming Systems, published in 2000.

Easy Street Advertisements and Articles, written by Casino Data Systems, published in 2000.

Enchanted Forest™ Gaming Description from Aristocrat, available in 1994.

Enchanted Unicorn Advertisement written by IGT, published in 2001.

"Fishin' Buddies," article published in Strictly Slots/Anchor Games, published in Apr. 2001.

"Ghoulish Gamble," article written by Strictly Slots/IGT, published Sep. 2000.

Gold Fever Advertisement, written by Atronic Casino Technology, Ltd., published 1999.

Gold Fever by Atronic, Web Site, written by Atronic Casino Technology, published Mar. 2002.

"Goooaal!" written by Bally Gaming, Inc., published Dec. 2000.

"It's A Blast," written by IGT, published on or before Dec. of 2004.

Jewel in the Crown Advertisements, written by Barcrest Ltd., published 1999.
Joker's Wild Advertisement written by IGT, published prior to 2001.
"Juicy Loot" by Bally Technologies, article from Strictly Slots, published Feb. 2008.
Kaboom game Web Site, including relevant portions of multiple web pages, written by WMS Gaming, http://www.wmsgaming.com/products/video/kaboom/index.php, published prior to Sep. 9, 2005.
Kaboom game website, written by WMS Gaming, published on or before Nov. 2007.
Loco Loot Article written by Strictly Slots/Aristocrat Leisure Industries, Pty Ltd., published in May 2002.
Fey, Marshall, "Slot Machines," published by Reno-Tahoe Specialty, Inc., pp. 1-34, 1989.
"Mountain Money," article written by Strictly Slots/Aristocrat Leisure Industries, Pty Ltd., published in Jun. 2002.
Mystery Mine Advertisement, Konami Australia Pty. Ltd., published Jan. 1999.
On the House Advertisement written by Olympic Video Gaming, published prior to 2002.
Penguin Pays Advertisement written by Aristocrat Incorporated, published in 1998.
"Reel Magic™ Gaming Machine," Description written by IGT, available in 1986.
South Park Advertisement, written by IGT, published Sep. 1999.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Wild Fortune) written by Olympic Video Gaming, available prior to Jun. 2007.

* cited by examiner

GAMING SYSTEM, GAMING DEVICE AND METHOD FOR PROVIDING CASCADING SYMBOLS WITH WILD FEATURES

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are known. Gaming machines generally require the player to place or make a wager to activate the primary or base game. In many of these gaming machines, the gaming machine generates a plurality of symbols and evaluates the generated symbols. The gaming machine provides zero, one, or more awards, wherein the awards are based on the player obtaining a winning symbol or symbol combination and on the amount of the wager (e.g., the higher the wager, the higher the award). Symbols or symbol combinations which are less likely to occur usually provide higher awards.

Some known gaming machines provide symbols associated with additional functionality in the primary or base game. One such symbol is a wild symbol. Wild symbols provide players with additional opportunities to obtain winning symbol combinations. If the gaming machine generates a wild symbol, the wild symbol enables the possibility of forming one or more winning symbol combinations along a payline that does not display all of the symbols necessary to form a winning symbol combination. That is, the wild symbol can function as any one of a plurality of different symbols missing from a winning symbol combination. For example, if a three reel slot machine generated a heart symbol, a wild symbol, and a heart symbol along a payline on the first, second, and third reels, and the gaming machine awards a player for a three heart symbol combination, the wild symbol substitutes for or functions as a heart symbol and enables the formation of a winning three heart symbol combination. Wild symbols therefore create more winning symbol combinations and lead to more awards provided to players. Thus, wild symbols in gaming machines provide players chances to win and provide additional excitement and entertainment for players.

Gaming machines which provide cascading symbol games are also known. In one such cascading symbol game, a gaming machine generates and displays a plurality of symbols in a plurality of symbol positions. The gaming machine evaluates the displayed symbols and provides an award if a winning symbol combination is formed. The gaming machine then removes all of the displayed symbols that form each of the winning combinations of symbols to create empty symbol positions. The gaming machine shifts zero, one, or more of the remaining displayed symbols into zero, one, or more of the empty symbol positions. If any empty symbol positions remain, the gaming machine generates and displays a symbol for each empty symbol position. The gaming machine reevaluates the displayed symbols and provides an award if any winning symbol combination is formed. The gaming machine repeats the steps of evaluating generated symbols, removing generated symbols, shifting generated symbols, and generating new symbols if winning symbol combinations continue to be formed. There is a continuing need to provide new and different gaming machines with such features that increase volatility and therefore increase player excitement.

SUMMARY

The gaming system, gaming device and method disclosed herein provide a cascading symbol game wherein upon an occurrence of an event, at least one symbol that replaces any removed symbols is a predetermined designated symbol such as a wild symbol. Such predetermined designated symbols provide players the opportunity to win more frequent and greater awards. Thus, the predetermined designated symbols provide an increased level of volatility to such a cascading symbol game.

In one embodiment, the gaming device generates and displays a plurality of symbols in a plurality of symbol positions. The gaming device removes at least one displayed symbol from at least one of the symbol positions and repositions at least one of the displayed symbols to create at least one empty symbol position. In this embodiment, if a designated event has occurred, the gaming device generates at least one predetermined designated symbol in at least one of the empty symbol positions. For example, the gaming device generates a predetermined designated wild symbol in one or more of the empty symbol positions. In one embodiment, any predetermined designated symbols are independent of and in addition to the plurality of symbols. That is, the predetermined designated symbols are separate from and not initially available with the plurality of symbols for the gaming device to generate and display in the plurality of symbol positions. The gaming device evaluates the displayed symbols (including any generated predetermined designated symbols) and provides any awards associated with any winning symbol combinations.

In one embodiment, the gaming device includes at least one matrix of symbol positions. In one such embodiment, the matrix of symbol positions is formed from a plurality of adjacently arranged reels. Each reel includes a plurality of symbols arranged on reels strips. In this embodiment, the gaming device also includes at least one designated symbol that is separate from and independent of the reels. In another embodiment, the gaming device includes at least one matrix of symbol positions arranged as a plurality of columns and a plurality of rows. In one such embodiment, the matrix of symbol positions is associated with a plurality of orders or sets of symbols that are available to be initially generated in such symbol positions. In this embodiment, the gaming device also includes at least one designated symbol that is separate from and independent of the sets of symbols that are available to be initially generated.

In one embodiment, the gaming device generates and displays a plurality of symbols for each of a plurality of symbol positions. The gaming device evaluates the symbols displayed for any winning symbol combinations. If the gaming device determines that at least one winning symbol combination was formed, the gaming device provides any award associated with the at least one winning symbol combination. In this embodiment, the gaming device removes at least one displayed symbol from the at least one winning symbol combination. In one embodiment, the gaming device repositions at least one of the displayed symbols into the symbol position of the at least one removed symbol to create at least one empty symbol position.

In one embodiment, the gaming device determines if a designated event occurred. In different embodiments, a designated event occurs based on any suitable event which occurs in association with (a) one or more plays of one or more primary games, (b) one or more plays of one or more secondary games, and/or (c) one or more occurrences which are independent of any primary or secondary games played.

In one embodiment, if the designated event has occurred, the gaming device generates one designated symbol, such as a wild symbol, in each of any empty symbol positions. That is, the gaming device causes a display of the wild symbols in one or more empty symbol positions, wherein the wild symbol is generated independent of and in addition to the plurality of symbols. In this embodiment, the gaming device reevaluates the symbols displayed for any winning symbol combinations. If the gaming device determines that at least one winning symbol combination is formed, the gaming device provides any award associated with the at least one winning symbol combination.

In one embodiment, if the designated event did not occur, the gaming device generates and displays a symbol in each of the empty symbol positions, wherein any symbol displayed in an empty symbol position is generated from the plurality of symbols. That is, the gaming device causes a display of the symbols generated from the plurality of symbols in any empty symbol position. In this embodiment, the gaming device reevaluates the symbols displayed for any winning symbol combinations. If the gaming device determines that at least one winning symbol combination is formed, the gaming device provides any award associated with the at least one winning symbol combination.

In one embodiment, if the designated event has occurred, the gaming device generates an announcement that designated symbols are available for the gaming device to generate. For example, the gaming device may generate an audio and/or a visual announcement that the player has qualified for designated symbols. It should be appreciated that the gaming device may generate any suitable announcement to alert the player that the player has qualified for designated symbols.

In one alternative embodiment, following an announcement that designated symbols are available for the gaming device to generate, the gaming device does not generate any designated symbols because no empty symbol positions are created for the designated symbols to be displayed in. For example, the gaming device announces to a player that designated symbols are available for the gaming device to generate at the beginning of a game. In this example, the gaming device generates and displays symbols from the plurality of symbols for each of a plurality of symbol positions. However, in this example, the gaming device does not remove any of the displayed symbols and thus does not generate any designated symbols. That is, the gaming device did not generate any designated symbols because the gaming device did not create any empty symbol positions. In this case, the benefit of the designated symbols was lost because the gaming device did not remove any displayed symbols. Thus, an announcement of the designated symbols creates excitement for the player about the possibility of additional opportunities to win even if the player does not get any benefit from the designated symbols in a play of the game following the announcement.

It should therefore be appreciated that designated symbols in a cascading symbol game provide additional opportunities to win more frequent awards for increased game volatility. Additional features and advantages are described herein, and will be apparent from the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
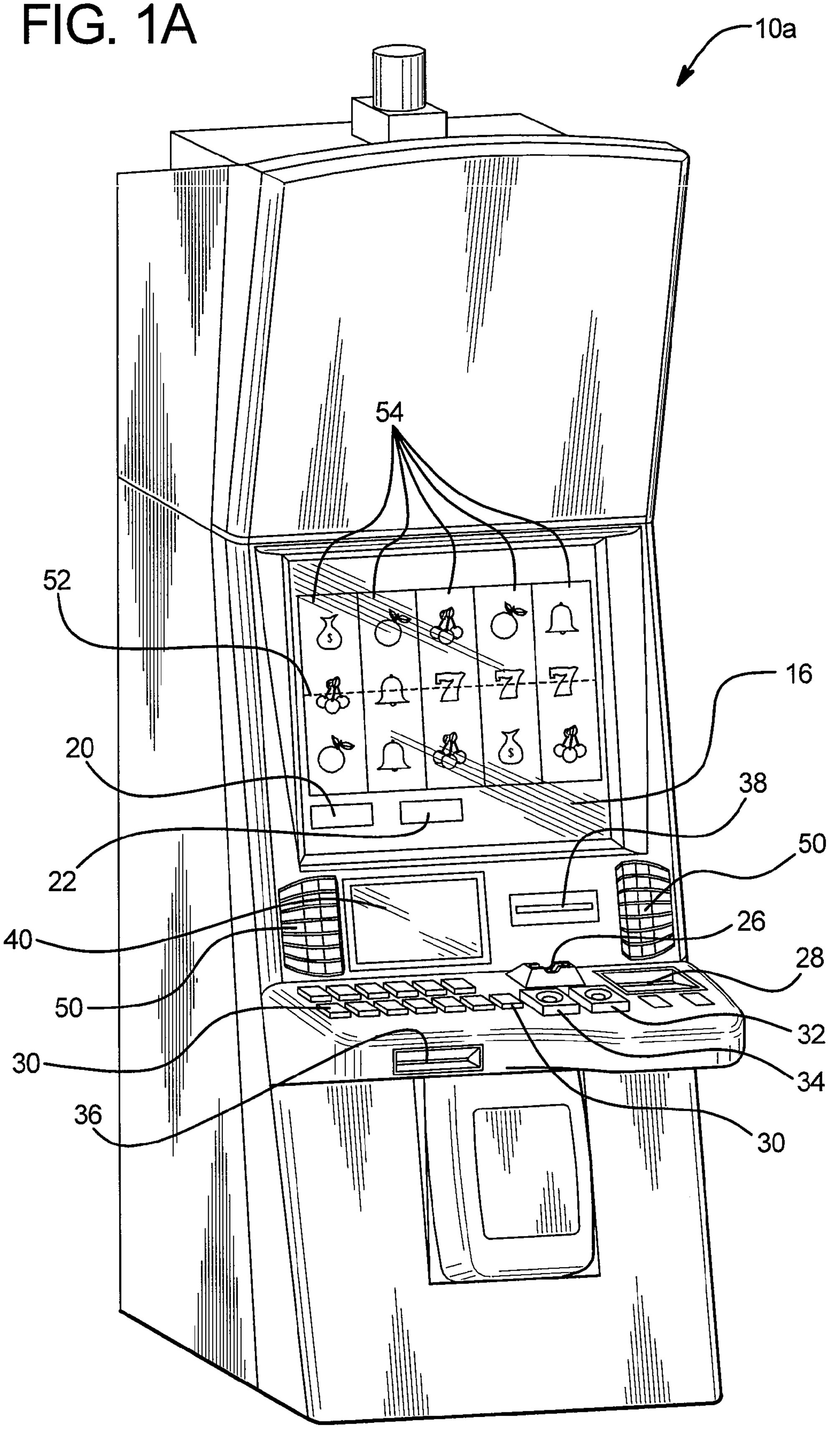
FIG. 1A is a front-side perspective view of one embodiment of the gaming device disclosed herein.
Figure 1B:
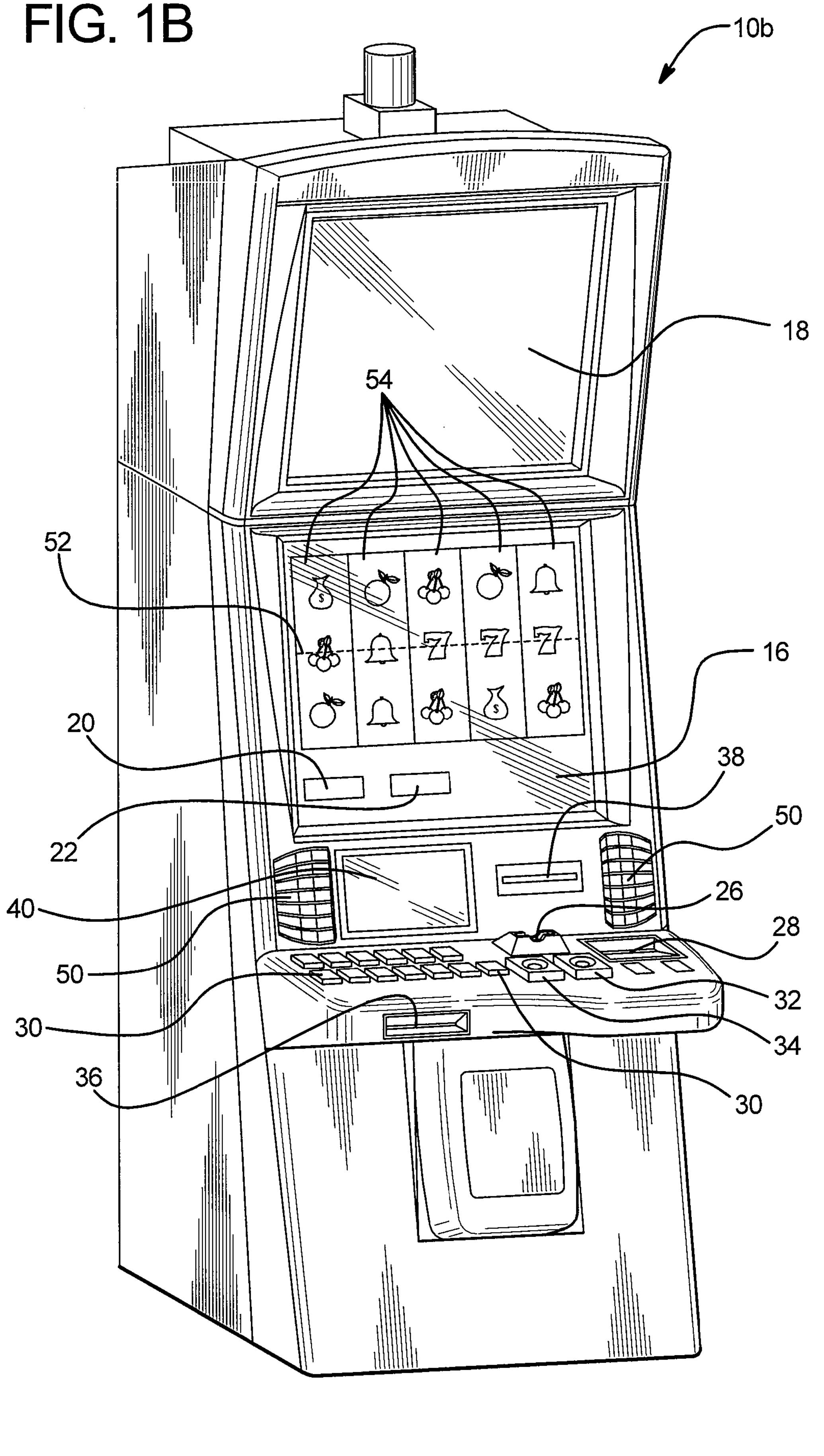
FIG. 1B is a front-side perspective view of another embodiment of the gaming device disclosed herein.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
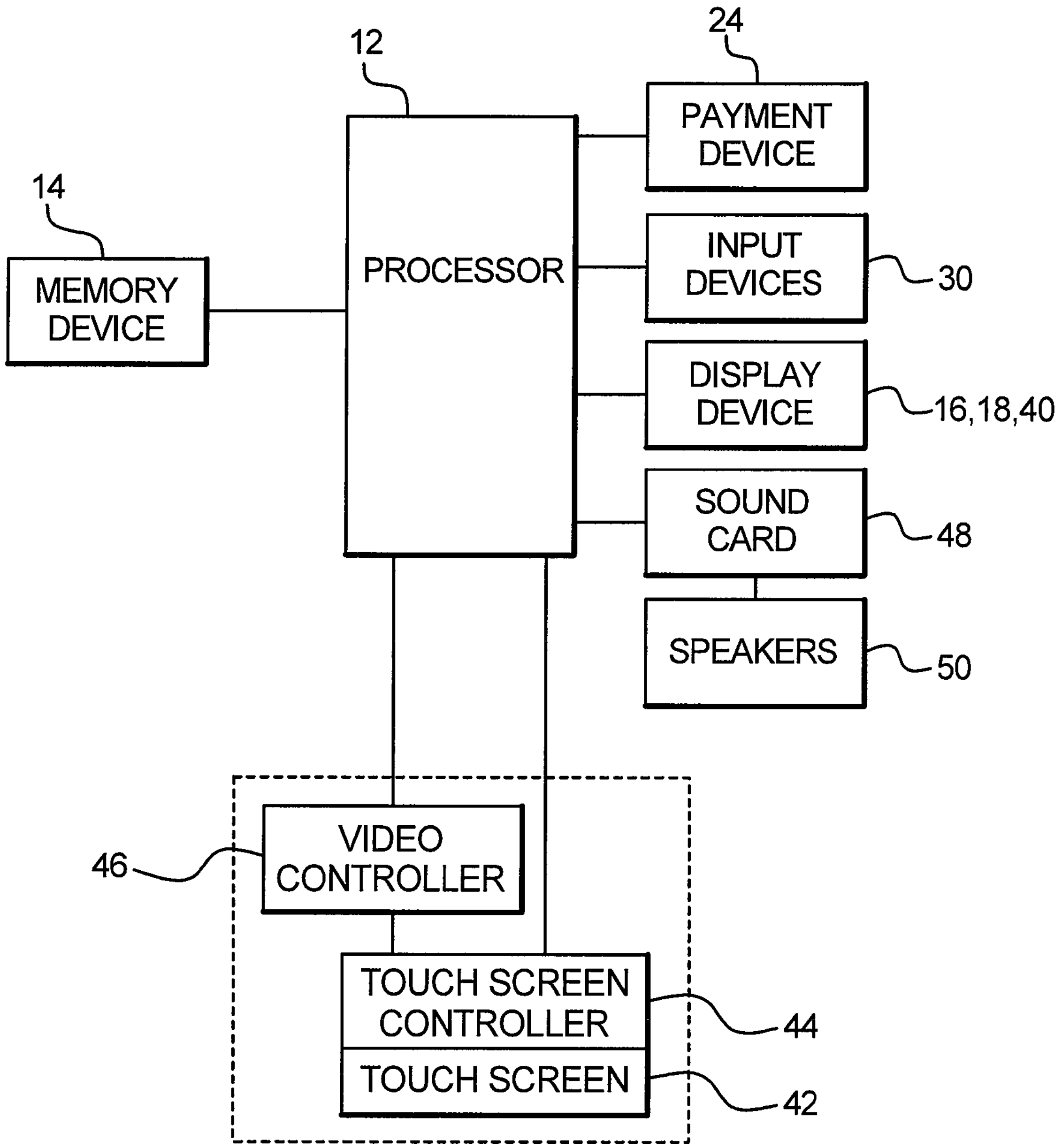
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as virtual, or video reels and wheels, dynamic lighting, video images, images of people, characters, places, things, faces of cards, and the like.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 to 3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
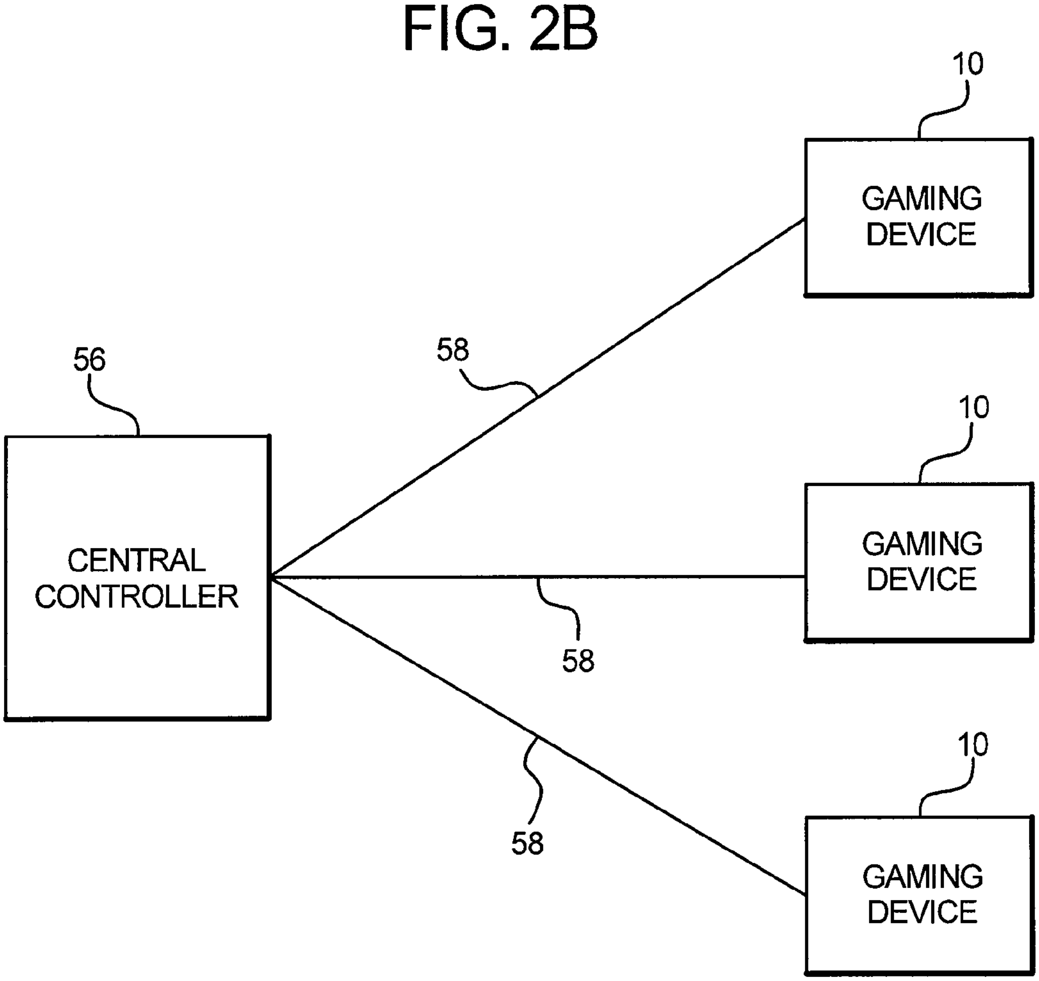
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Cascading Symbols with Designated Symbols

Figure 3:
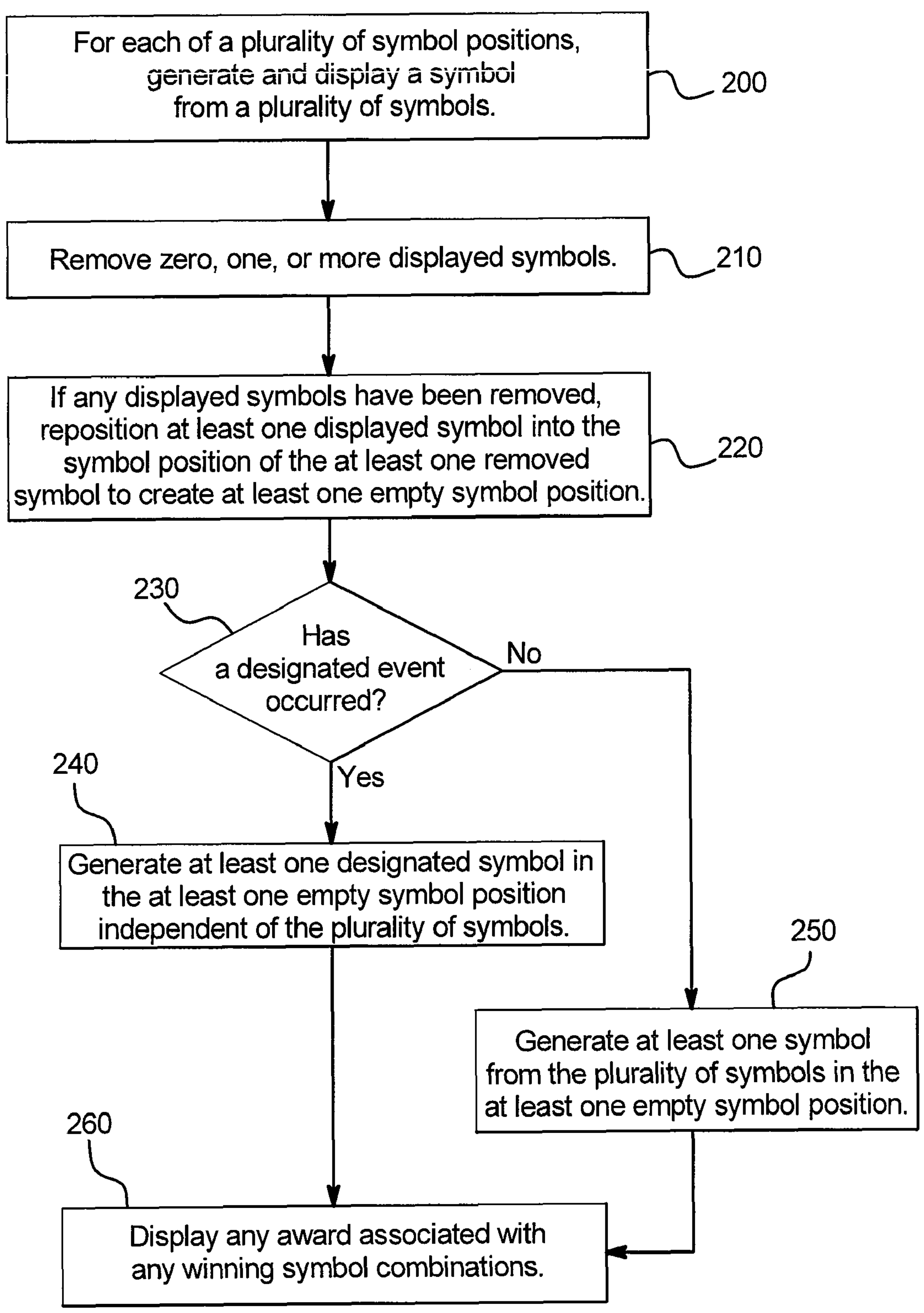
FIG. 3 is a flow diagram of one embodiment of the gaming device disclosed herein illustrating a gaming device that replaces at least one removed symbol with a designated symbol.
Figure 4A:
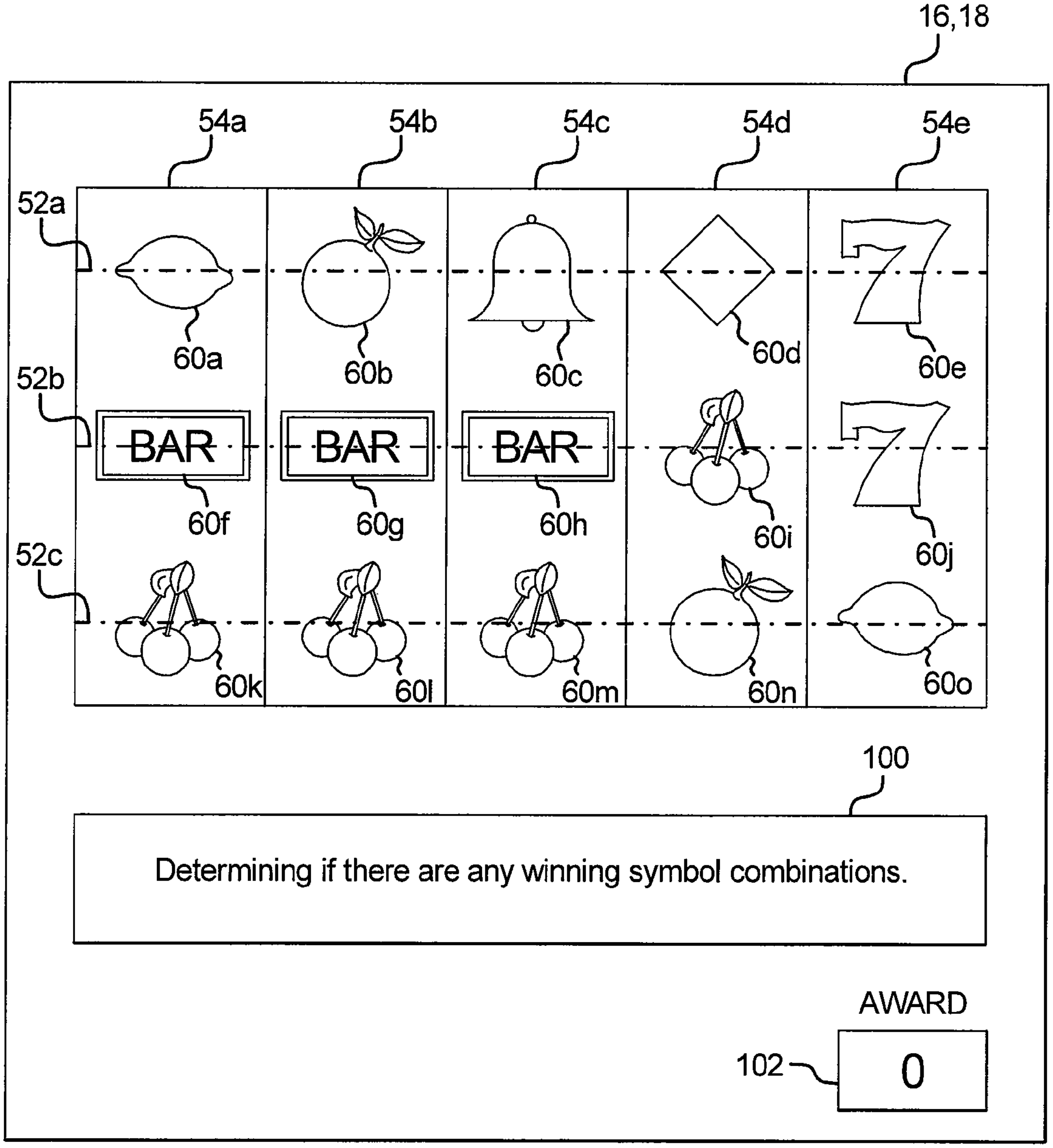
FIGS. 4A, 4B, 4C, 4D, 4E, 4F, 4G, and 4H are elevation views of one embodiment of the gaming device disclosed herein illustrating a cascading symbol game wherein a gaming device generates designated symbols in empty symbol positions.

Turning now to FIG. 3, in one embodiment, upon a suitable event, such as a player placing a wager or on initiation of a bonus game, the gaming device generates and displays a symbol from a plurality of symbols for each of a plurality of symbol positions as illustrated in block 200. For example, as illustrated in FIG. 4A, the gaming device provides a cascading symbol game with wild features. In one embodiment, each reel includes a first plurality of symbols arranged on reels strips. In this embodiment, for one or more reels, the gaming device also includes at least one designated symbol, such as a wild symbol, that is independent of and separate from the first plurality of symbols.

As seen in FIG. 4A, upon the suitable event to initiate the game, the gaming device generated and displayed a plurality of symbols for each reel 54*a*, 54*b*, 54*c*, 54*d*, and 54*e*. In this example, the gaming device generated lemon symbol 60*a*, bar symbol 60*f*, and cherry symbol 60*k* on reel 54*a*; orange symbol 60*b*, bar symbol 60*g*, and cherry symbol 60*l* on reel 54*b*; bell symbol 60*c*, bar symbol 60*h*, and cherry symbol 60*m* on reel 54*c*; diamond symbol 60*d*, cherry symbol 60*i*, and orange symbol 60*n*; on reel 54*d*; and seven symbol 60*e*, seven symbol 60*j*, and lemon symbol 60*o* on reel 54*d*. The gaming device evaluated the symbols displayed on the reels for any winning symbol combinations. As illustrated in FIG. 4A, an appropriate message such "DETERMINING IF THERE ARE ANY WINNING SYMBOL COMBINATIONS." may be provided to the player visually, such as in display area 100, or through suitable audio or audiovisual displays.

Figure 4B:
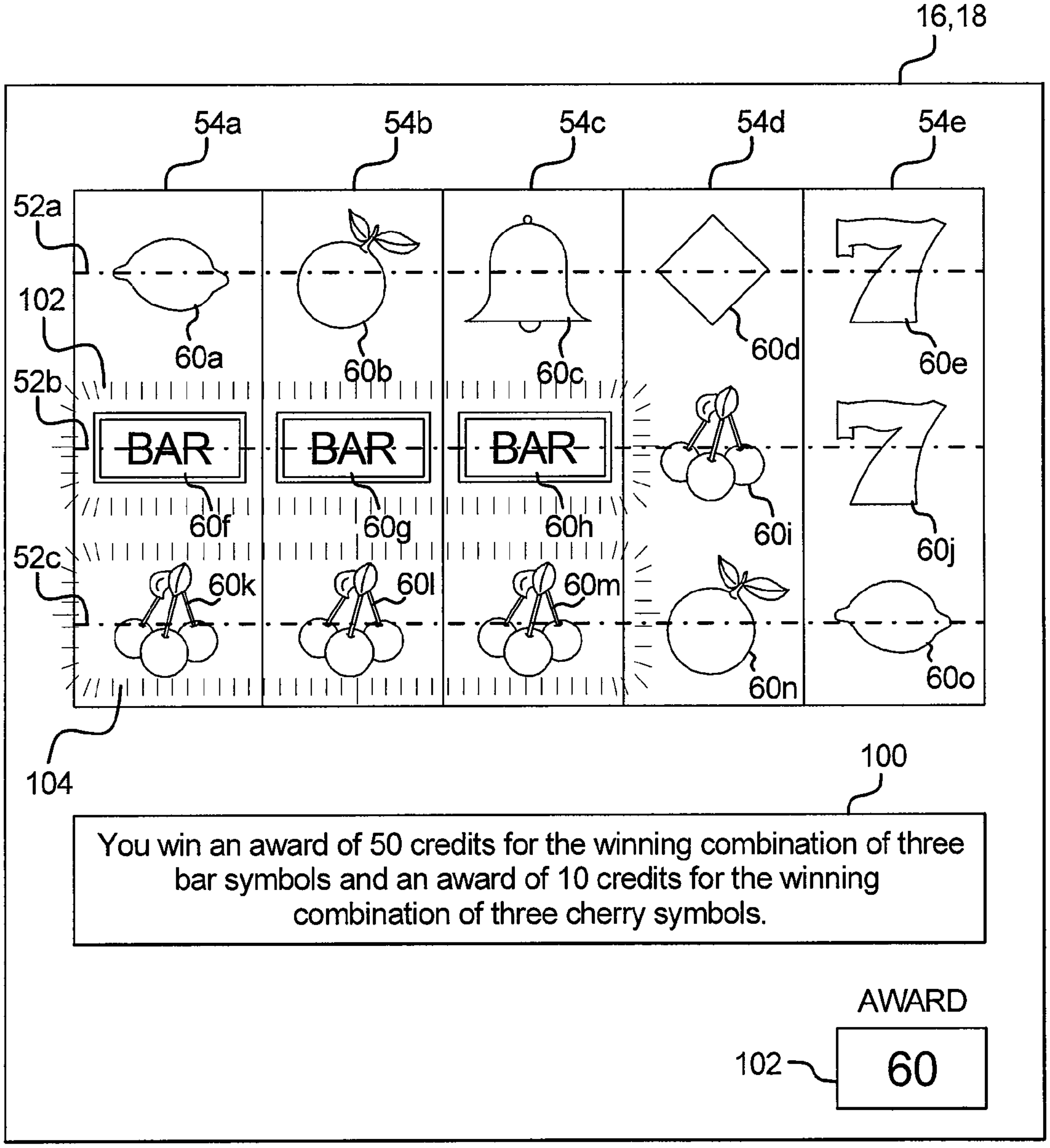

In one embodiment, the gaming device provides the player any award associated with any winning symbol combination. As illustrated in FIG. 4B, the gaming device determined that two winning symbol combinations were formed, wherein one winning symbol combination is formed from the three adjacent bar symbols 60*f* to 60*h* on payline 52*b* and a different winning symbol combination is formed from the three adjacent cherry symbols 60*k* to 60*m* on payline 52*c*. In one embodiment, the gaming device highlights the winning symbol combinations such as with indicators 102 and 104. An appropriate message such as "YOU WIN AN AWARD OF 50 CREDITS FOR THE WINNING COMBINATION OF THREE BAR SYMBOLS AND AN AWARD OF 10 CREDITS FOR THE WINNING COMBINATION OF THREE CHERRY SYMBOLS!" may also be provided to the player visually, such as in display area 100 and award indicator 102, or through suitable audio or audiovisual displays. In this example, the gaming device provides any award associated with the winning combination of bar symbols and the winning combination of cherry symbols.

Returning to FIG. 3, after providing any awards for any generated winning symbols or winning symbol combinations, in one embodiment, the gaming device removes zero, one, or more displayed symbols as illustrated in block 210. In alternative embodiments, the determination of which, if any, displayed symbols to remove is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

Figure 4C:
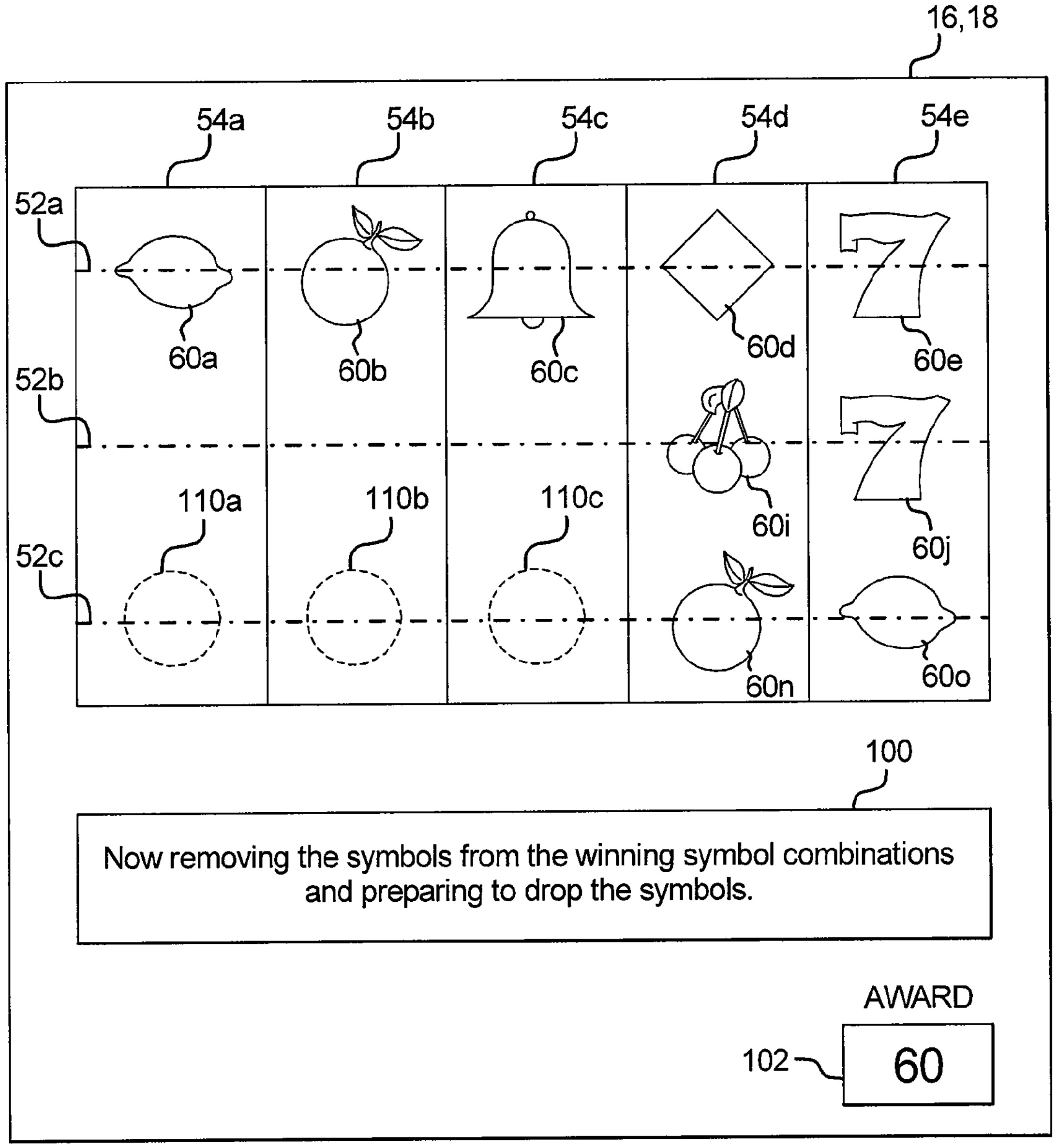

In one embodiment, the gaming device removes one or more displayed symbols from any suitable winning symbol combination. For example, as illustrated in FIG. 4C, the gaming device removed any symbol that formed part of a winning symbol combination. In this example, the gaming device removed the bar symbols 60*f* to 60*h* and the cherry symbols 60*k* to 60*m* on reels 54*a*, 54*b*, and 54*c*. It should be appreciated that in one embodiment the gaming device does not remove any symbols if no winning symbol combination are formed. In this embodiment, if no symbols are removed, the game ends.

Figure 4D:
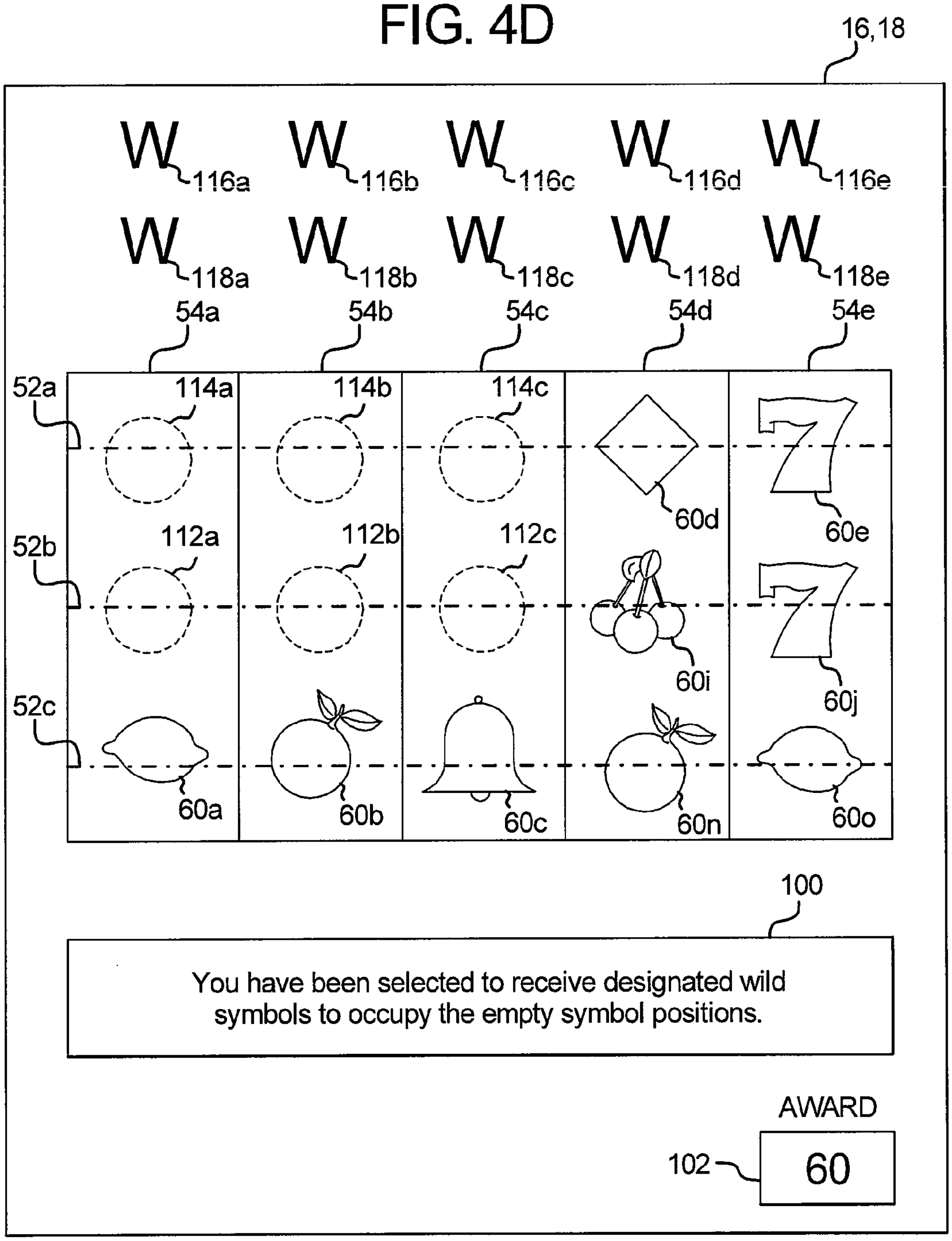

In one embodiment, as illustrated in block 220 of FIG. 3, if any displayed symbols have been removed, the gaming device repositions at least one displayed symbol into the symbol position of the at least one removed symbol to create at least one empty symbol position. In one example, the gaming device determined that lemon symbol 60*a* on reel 54*a*, orange symbol 60*b* on 54*b*, and bell symbol 60*c* on reel 54*c* are positioned above the empty symbol positions as illustrated in FIG. 4C. In this example, based on this determination, the gaming device repositioned or shifted lemon symbol 60*a*, orange symbol 60*b*, and bell symbol 60*c* into symbol positions 110*a*, 110*b*, and 110*c* respectively as illustrated in FIG. 4D. In this embodiment, the repositioned symbols created empty symbol positions 112*a*, 112*b*, 112*c*, 114*a*, 114*b*, 114*c* (shown in phantom) on reels 54*a*, 54*b*, and 54*c*.

In one example embodiment, the gaming device depicts lemon symbol 60*a*, orange symbol 60*b*, and bell symbol 60*c* falling into symbol positions 110*a*, 110*b*, and 110*c*, respectively. In an alternative example embodiment, the gaming device removes lemon symbol 60*a*, orange symbol 60*b*, and bell symbol 60*c* and regenerates and displays these symbols in symbol positions 110*a*, 110*b*, and 110*c*, respectively. An appropriate message such as "NOW REMOVING THE SYMBOLS FROM THE WINNING SYMBOL COMBINATIONS AND PREPARING TO DROP THE SYMBOLS." may also be provided to the player visually, such as in display area 100, or through suitable audio or audiovisual displays. It should be appreciated that any suitable depiction may be used to reposition the symbols. It should also be appreciated that any suitable displayed symbol may be repositioned into symbol positions of any removed symbols. It should further be appreciated that any suitable displayed symbol may be depicted shifting upwards, sideways, or moving in any suitable manner into symbol positions of any removed symbols.

It should be appreciated that in one embodiment, the gaming device does not reposition any displayed symbols. For example, if the gaming device only shifts symbols in a downward direction on the reels and the gaming device removed one or more displayed symbols from a top row of the displayed symbols, the gaming device does not reposition any of the displayed symbols. That is, displayed symbols were not positioned above the removed symbol positions, therefore displayed symbols were not available to shift in the downward direction. However, in alternative embodiments, the gaming device is not limited to shifting displayed symbols in the downward direction on the reels and displayed symbols may be depicted shifting in any suitable manner as described above.

In block 230 of FIG. 3, the gaming device determines if a designated or triggering event has occurred. In alternative embodiments, the designated event is a predetermined event, a randomly determined event, a randomly determined event based on the generated symbols or symbol combinations, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In different embodiments, the determination of if the designated event occurs is determined before, during, or after the generation of the symbols. In one such embodiment, while the symbols are being generated, a determination that the designated event occurs and at least one available designated symbol is displayed to the player. In another such embodiment, the gaming device displays one or more designated symbols accumulating over one or more plays of the primary game. In this embodiment, when a predetermined quantity of designated symbols have been accumulated, the gaming device determines that the designated event has occurred and displays such available designated symbols to the player.

As illustrated in block 250, if the gaming device determined that a designated event did not occur, in one embodiment, the gaming device generates one symbol from the plurality of symbols in each of any empty symbol positions. That is, the gaming device causes a display of symbols generated from the plurality of symbols in any empty symbol position. In this embodiment, the gaming device reevaluates the displayed symbols and displays any award associated with any winning symbol combinations as illustrated in block 260. It should be appreciated that if additional winning symbol combinations were formed, the cascading symbol game may continue cascading symbols (i.e., proceed to block 210 as described above).

In one embodiment, as illustrated in block 240, the gaming device generates at least one designated symbol in the at least one empty symbol position if the gaming device determined that the designated event occurred. In one embodiment, the designated symbol is a wild symbol. In one embodiment, the gaming device designates one or more wild symbols as available to be generated. It should be appreciated that any suitable symbol may be configured as the designated symbol. In different embodiments, the designated symbol includes, but is not limited to: a randomly determined symbol, a predetermined symbol, a player selected symbol, a symbol that matches one or more of any existing displayed symbols, a symbol related to one or more of any existing displayed symbols, a scatter symbol, a bonus triggering symbol, an accumulator symbol, an expanding symbol, a reflective symbol, a free symbol generation symbol, a free activation symbol, a modifier symbol, an anti-terminator symbol, a symbol which modifies the quantity of available symbols, a symbol which modifies the quantity of available symbol generators, a progressive award triggering symbol, a high value symbol and any combination thereof.

In one embodiment, if the gaming device generates any designated symbols, such as a wild symbol, the gaming device generates such designated symbols independent from and regardless of the plurality of symbols generated (or available to be generated). That is, when the gaming device generates the plurality of symbols (and no designated event has occurred), the designated symbols are not otherwise available for the gaming device to generate. On the other hand, when the gaming device generates any designated symbols (after a designated event has occurred), the gaming device utilizes a pool or set of designated symbols which is separate from and in addition to the pool of symbols that is used to initially generate the symbols at the start of the game.

In one example including a wild symbol, the gaming device determined that a designated event occurred and the gaming device formed empty symbol positions as illustrated in FIG. 4D, the gaming device designated as available wild symbols 116*a*, 116*b*, 116*c*, 116*d*, 116*e*, 118*a*, 118*b*, 118*c*, 118*d*, and 118*e*. In this example, the wild symbols designated as available are not dependent on the plurality of symbols on the reels. In an alternative embodiment, the one or more wild symbols designated as available are not displayed to the player. In one embodiment, the designated wild symbols are each associated with one of the reels 54*a*, 54*b*, 54*c*, 54*d*, and 54*e*. An appropriate message such as "YOU HAVE BEEN SELECTED TO RECEIVE DESIGNATED WILD SYMBOLS TO OCCUPY THE EMPTY SYMBOL POSITIONS." may also be provided to the player visually, such as in display area 100, or through suitable audio or audiovisual displays. It should be appreciated that displaying the wild symbols at this point in time is for illustration purposes only and the wild symbols may be displayed at any point in time before, during or after the play of the game.

Figure 4E:
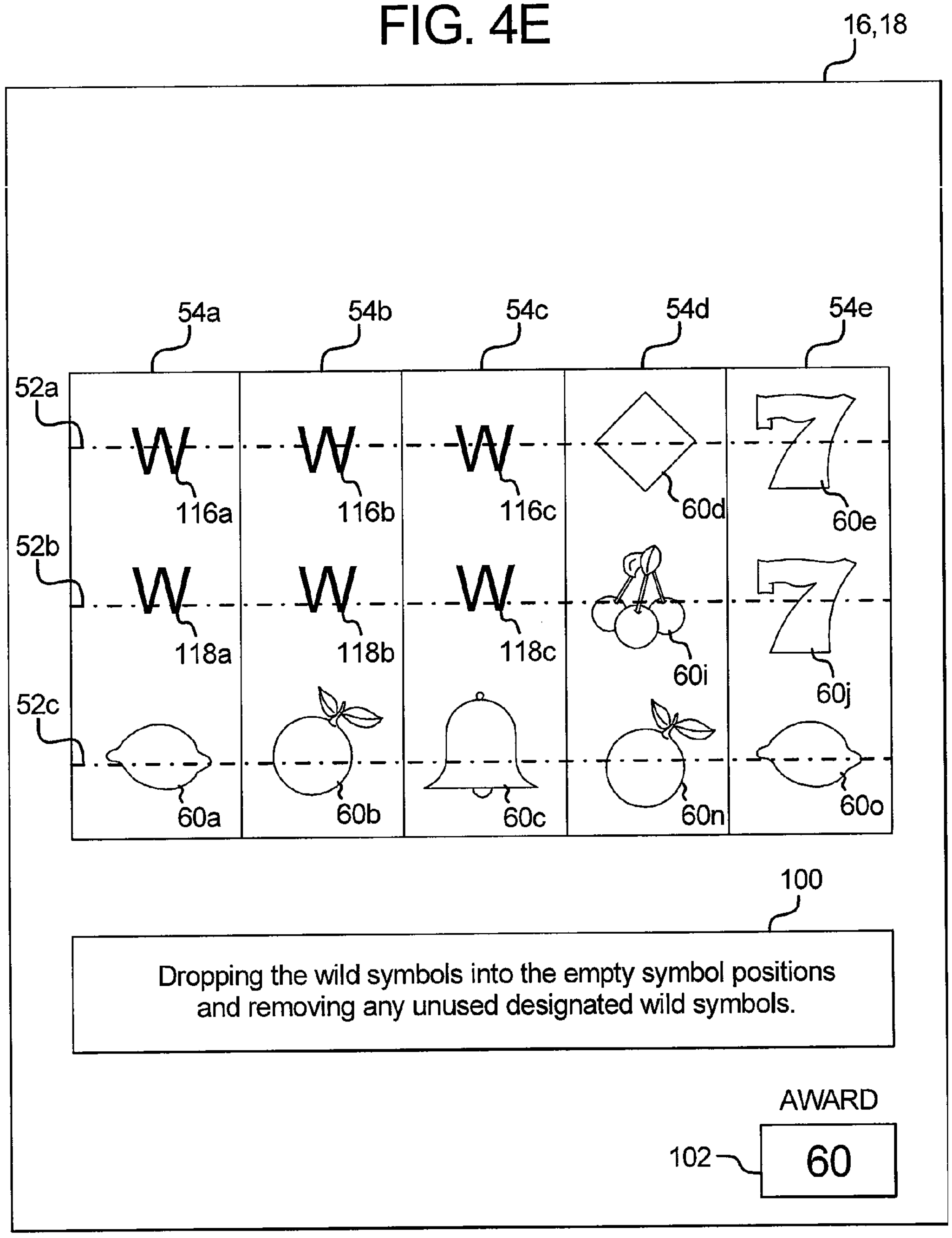

In one embodiment, the gaming device generates zero, one, or more designated symbols into one or more empty symbol positions. As illustrated in FIG. 4E, the gaming device generated designated wild symbols 116*a*, 116*b*, 116*c*, 118*a*, 118*b*, and 118*c* into the empty symbol positions on reels 54*a*, 54*b*, and 54*c*, respectively. In this example, the designated as available wild symbols were only available for one symbol generation, thus the gaming device removed the designated as available wild symbols 116*d*, 116*e*, 118*d*, 118*e* above reel 54*d* and 54*e*, respectively, because the gaming device did not create any empty symbol positions on these reels. An appropriate message such as "DROPPING THE WILD SYMBOLS INTO THE EMPTY SYMBOL POSITIONS AND REMOVING ANY UNUSED DESIGNATED WILD SYMBOLS." may also be provided to the player visually, such as in display area 100, or through suitable audio or audiovisual displays.

Figure 4F:
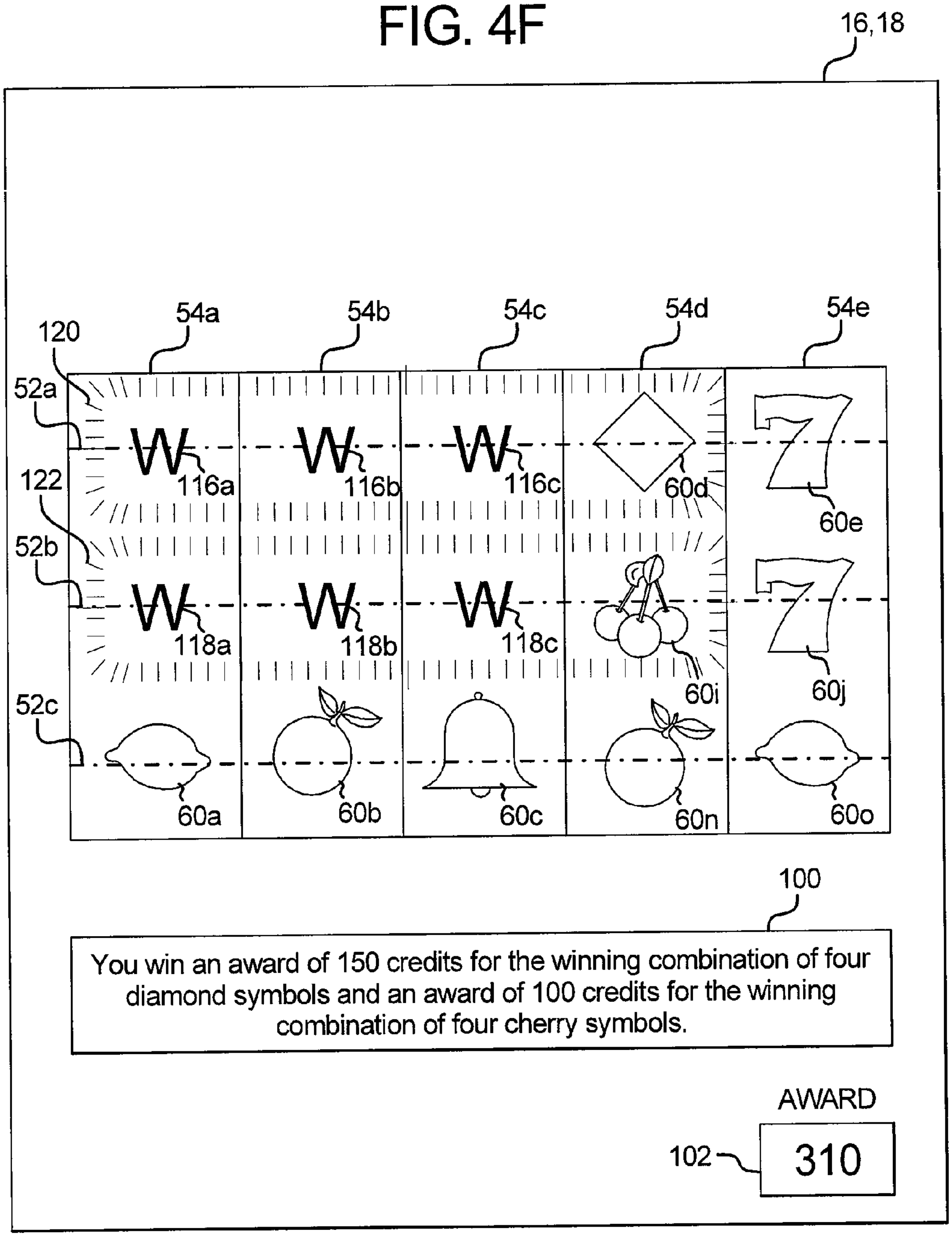

Returning to FIG. 3, the gaming device evaluates the displayed symbols and displays any award associated with any winning symbol combinations as illustrated in block 260. For example, as illustrated in FIG. 4F, the gaming device reevaluated the symbols displayed on the reels for any winning symbol combinations. The gaming device determined that two winning symbol combinations were formed, wherein one winning symbol combination is formed from diamond symbol 60*d* and adjacent designated wild symbols 116*a* to 116*c* on payline 52*a* and wherein a different winning symbol combination is formed from cherry symbol 60*i* and adjacent designated wild symbols 118*a* to 118*c* on payline 52*b*. In one embodiment, the gaming device highlights the winning symbol combinations such as with indicators 120 and 122. An appropriate message such as "YOU WIN AN AWARD OF 150 CREDITS FOR THE WINNING COMBINATION OF FOUR DIAMOND SYMBOLS AND AN AWARD OF 100 CREDITS FOR THE WINNING COMBINATION OF FOUR CHERRY SYMBOLS!" may also be provided to the player visually, such as in display area 100 and award indicator 102, or through suitable audio or audiovisual displays. In one embodiment, the gaming device provides any award associated with the winning combination of bar symbols and the winning combination of cherry symbols.

Figure 4G:
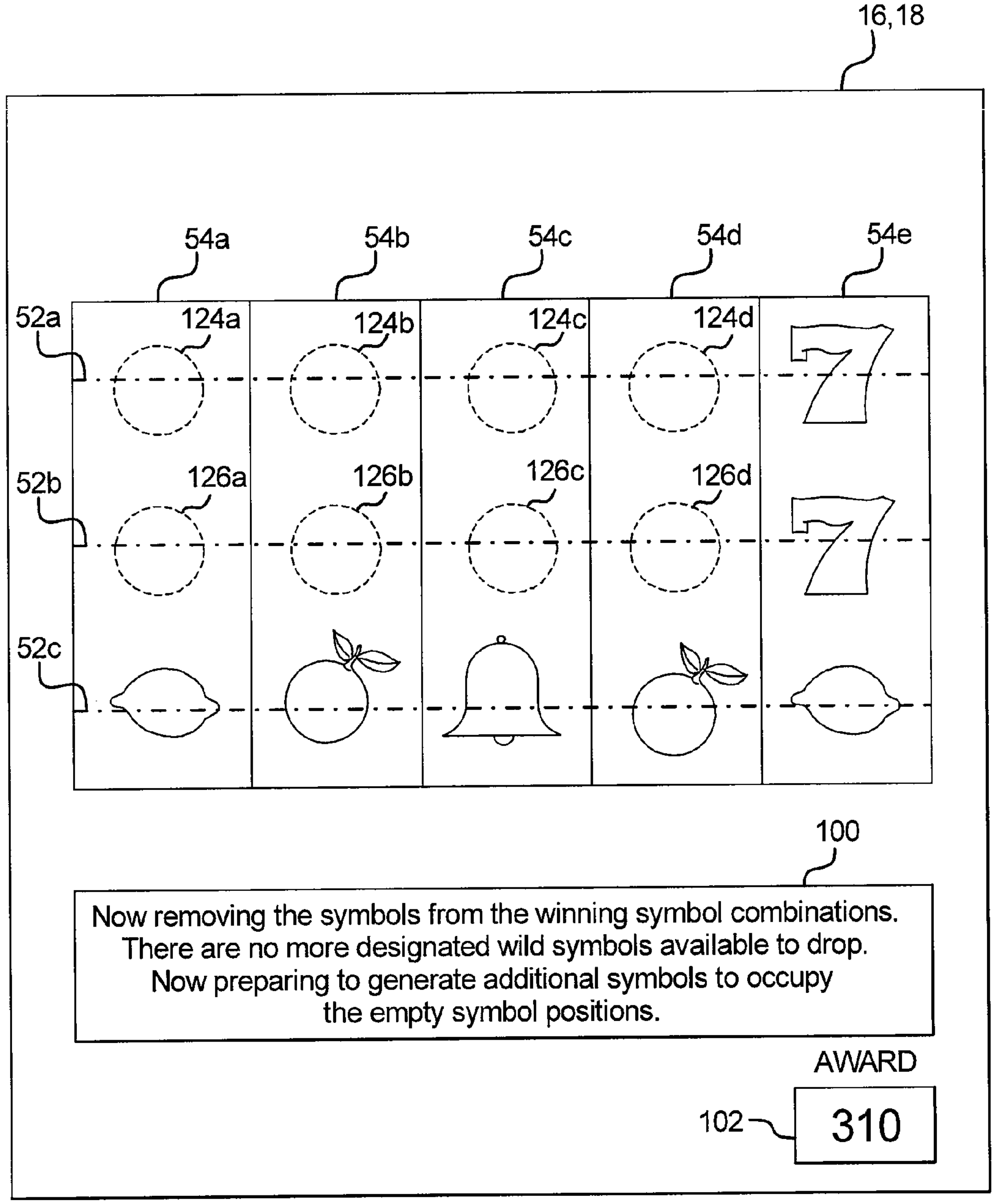

In one embodiment, the game continues as described above, if any winning symbol combination is formed. In one embodiment, as illustrated in FIG. 4G, the game continued and the gaming device removed any symbol that formed part of a winning symbol combination. The gaming device removed the winning symbol combination formed from diamond symbol 60*d* and adjacent designated wild symbols 116*a* to 116*c* and also removed the winning symbol combination formed from cherry symbol 60*i* and adjacent designated wild symbols 118*a* to 118*c* on reels 54*a*, 54*b*, 54*c*, and 54*d*, respectively. It should be appreciated that the gaming device may remove any suitable number of zero, one, or more symbols from the winning symbol combination or any of the displayed symbols as described above.

In the example embodiment illustrated in FIG. 4G, the gaming device determined that no symbols displayed on the reels were positioned above the removed symbols on reels 54*a*, 54*b*, 54*c*, and 54*d*, therefore the gaming device did not reposition any symbols. In this embodiment, based on the gaming device's determination that no symbols on the reels were available to drop, the symbol positions of the removed symbols created empty symbol positions 124*a*, 124*b*, 124*c*, 124*d*, 126*a*, 126*b*, 126*c*, and 126*d* (shown in phantom). In one embodiment, if the gaming device also determines that no wild symbols were designated as available, the gaming device generates a symbol into each of any empty symbol position from the plurality of symbols. An appropriate message such as "NOW REMOVING THE SYMBOLS FROM THE WINNING SYMBOL COMBINATIONS. THERE ARE NO MORE DESIGNATED WILD SYMBOLS AVAILABLE TO DROP. NOW PREPARING TO GENERATE ADDITIONAL SYMBOLS TO OCCUPY THE EMPTY SYMBOL POSITIONS." may also be provided to the player visually, such as in display area 100, or through suitable audio or audiovisual displays.

Figure 4H:
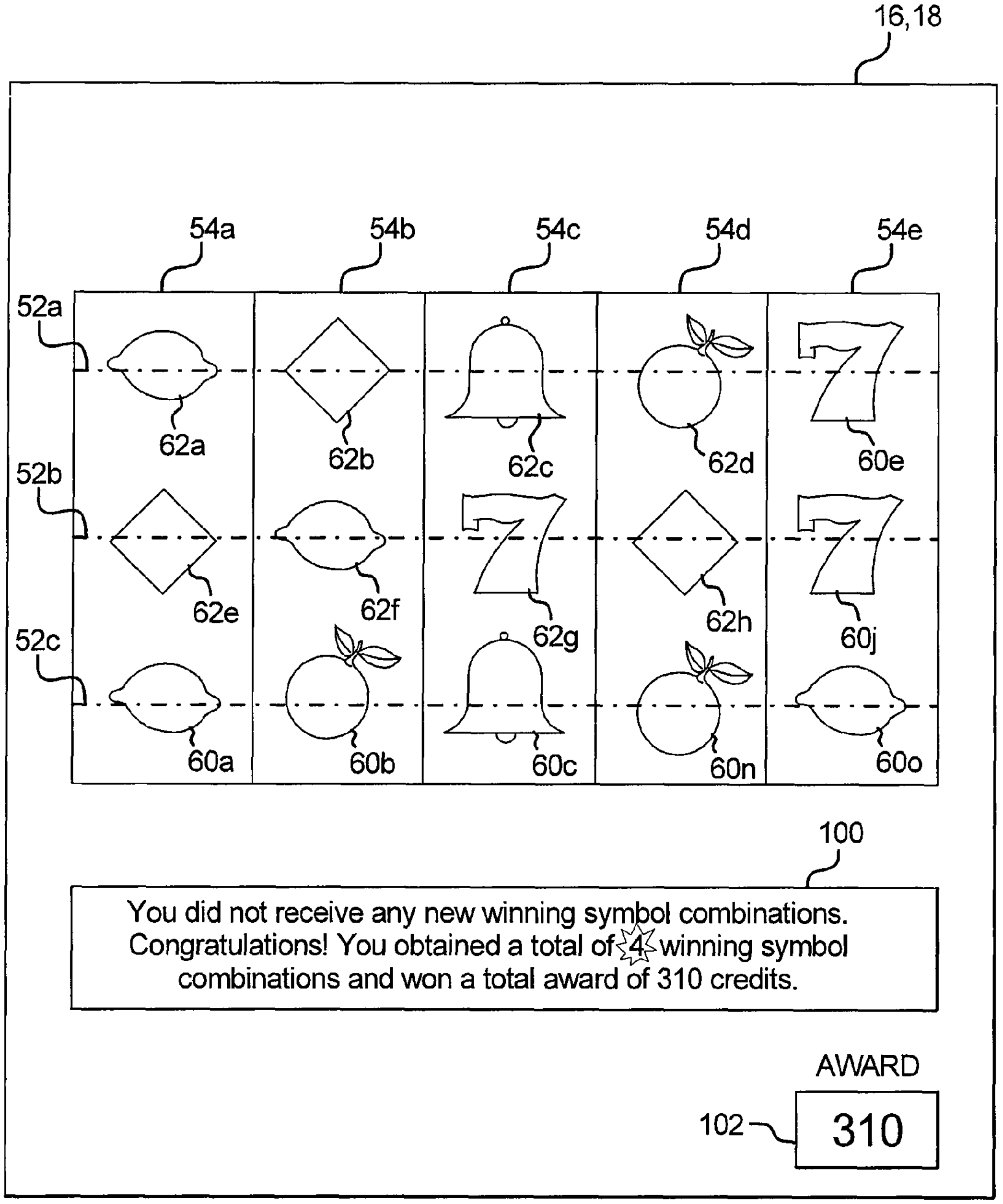

In this embodiment as illustrated in FIG. 4H, after determining that a designated event did not occur for this generation of symbols, the gaming device generated lemon symbol 62*a* and diamond symbol 62*e* in the empty symbol positions on reel 54*a*; diamond symbol 62*b* and lemon symbol 62*f* in the empty symbol positions on reel 54*b*; bell symbol 62*c* and seven symbol 62*g* in the empty symbol positions on reel 54*c*; and orange symbol 62*d* and diamond symbol 62*h* in the empty symbol positions on reel 54*d*. The gaming device also evaluated the symbols displayed on the reels for any winning symbol combinations. The gaming device determined that no winning symbol combinations were formed and the game ends. An appropriate message such as "YOU DID NOT RECEIVE ANY NEW WINNING SYMBOL COMBINATIONS. CONGRATULATIONS! YOU OBTAINED A TOTAL OF 4 WINNING SYMBOL COMBINATIONS AND WON A TOTAL AWARD OF 310 CREDITS." may also be provided to the player visually, such as in display area 100, or through suitable audio or audiovisual displays. It should be appreciated that if additional winning symbol combinations were formed, the cascading symbol game may continue as described above, zero, one, or more times.

In one embodiment, the generation of zero, one, or more designated symbols is implemented with one or more free symbol generations or free activations. That is, in one embodiment, during a free symbol generation game or during a free game, the gaming device generates designated symbols into empty symbol positions on the reels. In one embodiment, if a game is activated based on a wager, the gaming device does not generate designated symbols. In an alternative embodiment, the gaming device generates designated symbols for some games activated based on a free symbol generation, but not for each game activated based a free symbol generation. For example, in one embodiment including five free generations, the gaming device generates designated symbols for a first and fourth free symbol generations, but not for a second, third, and fifth free symbol generations. It should be appreciated that the gaming device may generate designated symbols for any suitable number of zero, one, or more free symbol generations.

In one embodiment, the designated event occurs (e.g., to cause the generation of designated symbols) based on one or more game play events, such as a symbol-driven trigger. In other embodiments, the designated event occurs based on exceeding a certain amount of game play (such as number of games, number of credits, or amount of time), or reaching a specified number of points earned during game play.

In another such embodiment, a designated event occurs (e.g., to cause the generation of designated symbols) based on a random trigger or on an apparently random trigger. In one such embodiment, the gaming device does not provide any apparent reasons to the player for the occurrence of the designated event, wherein the designated event is not based on any event in any of the plays of any primary games or on any of the plays of any secondary game of the gaming machines in the gaming system. That is, a designated event occurs without any explanation or alternatively with simple explanations. In another embodiment, a designated event occurs at least partially based on a game event, such as a symbol-driven trigger, and at least partially based on a non-game play, random event.

In one such embodiment, the occurrence of the designated event (e.g., to cause the generation of designated symbols) is randomly determined, wherein different players are assigned different chances of obtaining a designated event based on their respective wager levels. For example, if a first player wagered 500 coins and a second player wagered 225 coins and the chance of obtaining the designated event was 1/20,000, the first player would have a 2.5% (500/20,000) chance of obtaining the designated event for the first player while the second player would have a 1.125% (225/20,000) chance of obtaining the designated event for the second player.

In one such embodiment, the designated event occurs (e.g., to cause the generation of designated symbols) based on at least one accumulated value progressive award incremented to a progressive award hit value. In this embodiment, the gaming system includes one or more accumulated value progressive awards or Nth coin progressive awards. Such accumulated value progressive awards are driven by an amount of wagers placed or a suitable coin-in amount. In one such embodiment, each accumulated value progressive award is associated with a range of values, wherein a designated event will occur when the progressive award increments to a progressive award hit value within the range of values associated with that progressive award. That is, when an accumulated value progressive award increases to a determined progressive award hit value, a designated event will occur. In different embodiments, the progressive award hit value at which an accumulated value progressive award causes a designated event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a designated event to occur, the accumulated value progressive award is reset to a default value and starts incrementing from the default progressive award level.

In operation of one such embodiment, the central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) causes a designated event to occur when the progressive award or prize pool equals the determined accumulated value progressive award hit value. In this embodiment, the accumulated value progressive award hit value is determined at random to maintain fairness for the players at the gaming devices in the gaming system, wherein the players are not aware of any determined accumulated value progressive award hit value.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award is based on a player's status (via a player tracking system).

In another such embodiment, the designated event occurs (e.g., to cause the generation of designated symbols) based on time. In this embodiment, a time is set for when a designated event will occur. In one embodiment, such a set time is based on historic data. For example, if previous designated events have occurred after approximately thirty-seven minutes, a designated event may be set to trigger thirty-seven minutes from the conclusion of the previous designated event. In one embodiment, a suitable algorithm is implemented to determine the player who wagered at or closest to this time with tie-breaking based on any number of factors (e.g., player tracking history, amount of or recent wagers placed). In this embodiment, the gaming device which the algorithm determined wagered closest to when the designated event occurred is enabled to participate in the next designated event. In another embodiment, one of the gaming devices which placed a wager during a designated time period is randomly selected and enabled to participate in the designated event.

In another such embodiment, the designated event occurs (e.g., to cause the generation of designated symbols) based on a predefined variable reaching a defined parameter threshold. For example, the designated event occurs when the 500th different player has played a gaming machine associated with the designated event (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for the occurrence of the designated event.

In another such embodiment, the designated event occurs (e.g., to cause the generation of designated symbols) after a random number of plays in which a designated event has not occurred. In another embodiment, the occurrence of the designated event is based upon gaming system operator defined player eligibility parameters stored on a player tracking system (such as via a player tracking card or other suitable manner). In another embodiment, the occurrence of the designated event is based upon gaming system operator defined player eligibility parameters stored on a player tracking system (such as via a player tracking card or other suitable manner).

In another such embodiment, the occurrence of the designated event (e.g., to cause the generation of designated symbols) includes a system determination which is based on a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status; (d) the existence of credits on the gaming device may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In one such embodiment, based on the gaming machine's state as well as one or more wager pools associated with the gaming machine, the central controller determines which of these gaming machines obtains an occurrence of a designated event (e.g., to cause the generation of designated symbols). In one embodiment, the gaming machine which has been classified as active the longest since the last designated event obtains a designated event. In another embodiment, the determination of which gaming device will obtain a designated event is based on the relative proportion of gaming/wagering activity at each gaming device in the gaming system. In this embodiment, the player who consistently places a higher wager is more likely to obtain a designated event than a player who consistently places a minimum wager.

In one alternative embodiment, a central controller and an individual gaming machine work in conjunction with each other to determine when the designated event will occur. In one embodiment, an individual gaming machine may determine when to cause one or more designated events to occur. In another embodiment, an individual gaming machine may determine when to cause at least one designated event to occur and the central controller determines when to cause at least one designated event to occur.

In another embodiment, the central controller determines, in cooperation with the gaming device, when to cause a designated event to occur by utilizing one or more random number generators. In this embodiment, the central controller determines when to cause the designated event to occur by determining if any numbers allotted to a gaming device match a randomly selected number. In one such embodiment, upon or prior to each play of each gaming machine, a random number is selected from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine causes a designated event to occur. It should be appreciated that any suitable manner of causing the designated event to occur may be implemented with the gaming system disclosed herein.

In one embodiment, if a designated event occurs, the gaming device designates as available a predetermined number of designated symbols for any empty symbol positions. In one embodiment, the gaming device designates as available less designated symbols than necessary to cause a display of a designated symbol in each empty symbol position. For example, if the gaming device designates as available one designated symbol per reel and the gaming device removed two symbols from each reel, the gaming device generates one designated symbol in one empty symbol position on each of the reels. Thus, one empty symbol position remains on each of the reels because less designated symbols were designated as available than were necessary to cause a display of designated symbols in all of the empty symbol positions. In one embodiment, the gaming device generates additional symbols from the plurality of symbols to cause a display of the symbols in any remaining empty symbol positions (e.g., from the symbols arranged on the reels).

In an alternative embodiment, if the designated event occurs, the gaming device designates as available more designated symbols than necessary to cause a display of designated symbols in all of the empty symbol positions on the reels. In one embodiment, wherein the gaming device designates as available more designated symbols than necessary to cause a display of designated symbols in empty symbol positions, the designated symbols are saved for later use in the same game or saved for use in a play of a different game. In one alternative embodiment, any remaining designated symbols may not be saved for use in a later or different game. In one such embodiment, any remaining designated symbols may be saved for a designated period of time (or a designated quantity of games played) and then if unused, any saved designated symbols expire. In such embodiments, any remaining designated symbols are saved in association with a player tracking system, in association with the central server and/or in association with the individual gaming devices. It should be appreciated, that the quantity of designated symbols determined as available may be any suitable number of zero, one, or more designated symbols. In alternative embodiments, the quantity of designated symbols determined as available is randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one alternative embodiment, if a designated event occurs, the gaming device determines if any designated symbols are designated as available for each individual reel. For example, the gaming device determines that a plurality of designated symbols are designated as available for a first reel and a last reel, and designated symbols are not available for the remaining reels. That is, the gaming device is configured to generate designated symbols in empty symbol positions on the first reel and the last reel, but not on any of the remaining reels. In alternative embodiments, the determination of if each reel is associated with zero, one, or more available designated symbols is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria. It should also be appreciated that the gaming device may designate as available designated symbols for any suitable number of zero, one, or more reels.

In one alternative embodiment, if a designated event occurs, the gaming device determines if different quantities of designated symbols are designated as available for different reels (i.e., as opposed to designating as available the same quantity of designated symbols for each reel that is associated with designated symbols). For example, the gaming device designates as available three designated symbols for a first reel, while the gaming device designates as available one designated symbol for all of the remaining reels. Thus, in one embodiment, the gaming device is configured to generate more designated symbols on one or more reels than on other reels. In alternative embodiments, the determination of if different quantities of designated symbols are designated as available for each reel is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one embodiment, if the designated event occurs, the gaming device generates a quantity of N designated symbols (e.g., wherein N is a number such as 2) for a single generation of designated symbols. In alternative embodiments, the determination of the quantity of N designated symbols that is generated for a single generation of designated symbols is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one alternative embodiment, if the designated event occurs, the gaming device generates a quantity of N designated symbols for T generations of designated symbols (e.g., wherein T is the number of times the gaming device generates designated symbols in a play of a game). In alternative embodiments, the determination of the number of T generations of designated symbols is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming device removes any designated as available wild symbols once the gaming device generates the wild symbols into empty symbol positions on the reels. That is, the gaming device discards the designated as available wild symbols that are not generated into empty symbol positions. In one embodiment, the gaming device saves any non-generated or non-utilized designated as available wild symbols for later use in the same game or for later use in a different game. In one embodiment, the gaming device saves a predetermined quantity of non-generated designated as available wild symbols for zero, one, or more reels. In another embodiment, the gaming device saves a predetermined quantity of non-generated designated as available wild symbols for zero, one, or more player selected reels. In one embodiment, the gaming device removes non-generated designated as available wild symbols after zero, one, or more generations of designated wild symbols. In an alternative embodiment, the gaming device removes non-generated designated as available wild symbols after a predetermined amount of time has elapsed.

In alternative embodiments, the determination of when to remove any non-generated or non-utilized designated as available wild symbols is a predetermined event, a randomly determined event, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria. In different embodiments, the determination to remove any non-generated or non-utilized designated as available wild symbols is determined before, during, or after a generation of the designated wild symbols.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, the method comprising:

(a) for each of a plurality of symbol positions, causing at least one processor to execute a plurality of instructions to cause the at least one processor to operate with at least one display device to cause a random determination and display of a symbol from a first plurality of different symbols, said plurality of symbol positions forming at least three columns and at least three rows, said at least three rows including a first row, a second row positioned adjacent to the first row and a third row positioned adjacent to the second row;

(b) for at least one of any winning symbol combinations formed by said displayed symbols:

(i) causing the at least one display device to display any award associated with the winning symbol combination, (ii) providing any displayed award associated with the winning symbol combination, (iii) causing the at least one processor to execute the plurality of instructions to cause the at least one processor to operate with the at least one display device to remove at least one of the displayed symbols which forms said winning symbol combination, (iv) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (v) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position;

(c) if at least one empty symbol position is created:

(i) thereafter causing the at least one processor to execute the plurality of instructions to cause a different random determination of whether any predetermined designated symbols will be displayed in any of the created empty symbol positions, wherein the different random determination is:

(A) independent of any formed winning symbol combinations, and (B) independent of any generation of any symbols;

(ii) if the different random determination is that at least one predetermined designated symbol will be displayed in at least one of the created empty symbol positions, causing the at least one processor to execute the plurality of instructions to cause the at least one processor to operate with the at least one display device to generate and display at least one predetermined designated symbol in at least one of the empty symbol positions, wherein the at least one predetermined designated symbol is generated independent of each of the symbols of the first plurality of symbols; and (d) for each of any winning symbol combinations formed by said displayed symbols:

(i) causing the at least one display device to display any award associated with said winning symbol combination, and (ii) providing any displayed award associated with said winning symbol combination.

2. The method of claim 1, which includes causing the at least one processor to execute the plurality of instructions to cause the at least one processor to operate with the at least one display device to generate and display another one of the first plurality of symbols in at least one of any empty symbol positions if the different random determination is that no predetermined designated symbols will be displayed in any created empty symbol positions.

3. The method of claim 1, which includes causing the at least one processor to execute the plurality of instructions to cause the at least one processor to operate with the at least one display device to generate and display at least another one of the symbols from the first plurality of symbols for each remaining empty symbol position if any symbol positions remain empty after generating any predetermined designated symbols.

4. The method of claim 1, which includes causing the at least one processor to execute the plurality of instructions to cause the at least one processor to operate with the at least one display device to generate and display a designated quantity of predetermined designated symbols per column of symbol positions if the different random determination is that at least one predetermined designated symbol will be displayed in at least one of the created empty symbol positions.

5. The method of claim 4, wherein the designated quantity of predetermined designated symbols per column of symbol positions is at least one.

6. The method of claim 1, which includes causing the at least one processor to execute the plurality of instructions to cause the at least one processor to operate with the at least one display device to generate and display a predetermined designated symbol in each of any empty symbol positions if the different random determination is that at least one predetermined designated symbol will be displayed in at least one of the created empty symbol positions.

7. The method of claim 1, wherein the predetermined designated symbol is a wild symbol.

8. The method of claim 1, which includes causing the at least one processor to execute the plurality of instructions to cause the at least one processor to operate with the at least one display device to generate and display each of the plurality of symbols of the plurality of symbol positions independent of each other.

9. The method of claim 1, which includes repeating steps (b) to (d) at least once if any winning symbol combination is formed by the displayed symbols.

10. The method of claim 1, which includes repeating (b) to (d) until none of any winning symbol combinations are formed by the displayed symbols.

11. The method of claim 1, wherein said first row of symbol positions is positioned below the second row of symbol positions.

12. The method of claim 1, which includes, for a plurality of any winning symbol combinations formed by said displayed symbols:

(i) causing the at least one display device to display any award associated with the winning symbol combination, (ii) providing any displayed award associated with the winning symbol combination, (iii) causing the at least one processor to execute the plurality of instructions to cause the at least one processor to operate with the at least one display device to remove at least one of the displayed symbols which forms said winning symbol combination, (iv) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (v) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position.

13. The method of claim 1, which includes, for each of any winning symbol combinations formed by said displayed symbols:

(i) causing the at least one display device to display any award associated with the winning symbol combination, (ii) providing any displayed award associated with the winning symbol combination, (iii) causing the at least one processor to execute the plurality of instructions to cause the at least one processor to operate with the at least one display device to remove at least one of the displayed symbols which forms said winning symbol combination, (iv) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (v) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position.

14. The method of claim 1, which is provided through a data network.

15. The method of claim 14, wherein the data network is an internet.

16. A method of operating a gaming system, the method comprising:

(a) for each of a plurality of symbol positions, causing at least one processor to execute a plurality of instructions to cause the at least one processor to operate with at least one display device to cause a random determination and display of a symbol from a first plurality of different symbols, said plurality of symbol positions forming at least three columns and at least three rows, said at least three rows including a first row, a second row positioned adjacent to the first row and a third row positioned adjacent to the second row;

(b) for at least one of any winning symbol combinations formed by said displayed symbols:

(i) first:

(A) causing the at least one display device to display any award associated with the winning symbol combination, and (B) providing any displayed award associated with the winning symbol combination, (ii) then, causing the at least one processor to execute the plurality of instructions to cause the at least one processor to operate with the at least one display device to remove at least one of the displayed symbols which forms said winning symbol combination, and (iii) then for each of any symbols removed from the first row of the symbol positions:

(A) causing the at least one processor to execute the plurality of instructions to cause the at least one processor to operate with the at least one display device to reposition at least one of the displayed symbols to another one of the symbol positions to create at least one empty symbol position, and (B) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position;

(c) if at least one empty symbol position is created:

(i) thereafter causing the at least one processor to execute the plurality of instructions to cause a different random determination of whether any predetermined designated symbols will be displayed in any of the created empty symbol positions, wherein the different random determination is:

(A) independent of any formed winning symbol combinations, and (B) independent of any generation of any symbols, and (ii) if the different random determination is that at least one predetermined designated symbol will be displayed in at least one of the created empty symbol positions, causing the at least one processor to execute the plurality of instructions to cause the at least one processor to operate with the at least one display device to generate and display at least one predetermined designated symbol in at least one of the empty symbol positions, wherein the at least one predetermined designated symbol is generated independent of each of the symbols of the first plurality of symbols; and (d) for each of any winning symbol combinations formed by said displayed symbols:

(i) causing the at least one display device to display any award associated with said winning symbol combination, and (ii) providing any displayed award associated with said winning symbol combination.

17. The method of claim 16, which includes causing the at least one processor to execute the plurality of instructions to cause the at least one processor to operate with the at least one display device to generate and display another one of the first plurality of symbols in at least one of any empty symbol positions if the different random determination is that no predetermined designated symbols will be displayed in any created empty symbol positions.

18. The method of claim 16, which includes causing the at least one processor to execute the plurality of instructions to cause the at least one processor to operate with the at least one display device to generate and display at least another one of the symbols from the first plurality of symbols for each remaining empty symbol position if any symbol positions remain empty after generating any predetermined designated symbols.

19. The method of claim 16, which includes causing the at least one processor to execute the plurality of instructions to cause the at least one processor to operate with the at least one display device to generate and display a designated quantity of predetermined designated symbols per column of symbol positions if the different random determination is that at least one predetermined designated symbol will be displayed in at least one of the created empty symbol positions.

20. The method of claim 19, wherein the designated quantity of predetermined designated symbols per column of symbol positions is at least one.

21. The method of claim 16, which includes causing the at least one processor to execute the plurality of instructions to cause the at least one processor to operate with the at least one display device to generate and display a predetermined designated symbol in each of any empty symbol positions if the different random determination is that at least one predetermined designated symbol will be displayed in at least one of the created empty symbol positions.

22. The method of claim 16, wherein the predetermined designated symbol is a wild symbol.

23. The method of claim 16, which includes causing the at least one processor to execute the plurality of instructions to cause the at least one processor to operate with the at least one display device to generate and display each of the plurality of symbols of the plurality of symbol positions independent of each other.

24. The method of claim 16, which includes repeating steps (b) to (d) at least once if any winning symbol combination is formed by the displayed symbols.

25. The method of claim 16, which includes repeating (b) to (d) until none of any winning symbol combinations are formed by the displayed symbols.

26. The method of claim 16, wherein said first row of symbol positions is positioned below the second row of symbol positions.

27. The method of claim 16, which includes, for a plurality of any winning symbol combinations formed by said displayed symbols:

(i) first:

(A) causing the at least one display device to display any award associated with the winning symbol combination, and (B) providing any displayed award associated with the winning symbol combination, (ii) then causing the at least one processor to execute the plurality of instructions to cause the at least one processor to operate with the at least one display device to remove at least one of the displayed symbols which forms said winning symbol combination, and (iii) then:

(A) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (B) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position.

28. The method of claim 16, which includes, for each of any winning symbol combinations formed by said displayed symbols:

(i) first:

(A) causing the at least one display device to display any award associated with the winning symbol combination, and (B) providing any displayed award associated with the winning symbol combination, (ii) then causing the at least one processor to execute the plurality of instructions to cause the at least one processor to operate with the at least one display device to remove at least one of the displayed symbols which forms said winning symbol combination, and (iii) then:

(A) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (B) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position.

29. The method of claim 16, which is provided through a data network.

30. The method of claim 29, wherein the data network is an internet.

31. A method of operating a gaming system, the method comprising:

(a) for each of a plurality of symbol positions, causing at least one processor to execute a plurality of instructions to cause the at least one processor to operate with at least one display device to cause a random determination and display of a symbol from a first plurality of different symbols, said plurality of symbol positions forming at least three columns and at least three rows, said at least three rows including a first row, a second row positioned adjacent to the first row and a third row positioned adjacent to the second row;

(b) for at least one of any winning symbol combinations formed by said displayed symbols:

(i) causing the at least one display device to display any award associated with the winning symbol combination, (ii) providing any displayed award associated with the winning symbol combination, (iii) causing the at least one processor to execute the plurality of instructions to cause the at least one processor to operate with the at least one display device to remove at least one of the displayed symbols which forms said winning symbol combination, (iv) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (v) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position;

(c) if at least one empty symbol position is created:

(i) thereafter causing the at least one processor to execute the plurality of instructions to cause a different random determination of whether any predetermined designated symbols will be displayed in any of the created empty symbol positions, wherein the different random determination is:

(A) independent of any formed winning symbol combinations, and (B) independent of any generation of any symbols, and (ii) if the different random determination is that at least one predetermined designated symbol will be displayed in at least one of the created empty symbol positions:

(A) causing the at least one processor to execute the plurality of instructions to randomly determine a quantity of predetermined designated symbols to display in a quantity of the empty symbol positions, said quantity being greater than zero, and (B) for each of the randomly determined quantity of predetermined designated symbols to display, causing the at least one processor to execute the plurality of instructions to cause the at least one processor to operate with the at least one display device to generate and display a predetermined designated symbol in one of the empty symbol positions, wherein each predetermined designated symbol is generated independent of each of the symbols of the first plurality of symbols; and (d) for each of any winning symbol combinations formed by said displayed symbols:

(i) causing the at least one display device to display any award associated with said winning symbol combination, and (ii) providing any displayed award associated with said winning symbol combination.

32. The method of claim 31, which includes causing the at least one processor to execute the plurality of instructions to cause the at least one processor to operate with the at least one display device to generate and display another one of the first plurality of symbols in at least one of any empty symbol positions if the different random determination is that no predetermined designated symbols will be displayed in any created empty symbol positions.

33. The method of claim 31, which includes causing the at least one processor to execute the plurality of instructions to cause the at least one processor to operate with the at least one display device to generate and display at least another one of the symbols from the first plurality of symbols for each remaining empty symbol position if any symbol positions remain empty after generating each of said randomly determined quantity of predetermined designated symbols.

34. The method of claim 31, wherein the predetermined designated symbol is a wild symbol.

35. The method of claim 31, which includes repeating steps (b) to (d) at least once if any winning symbol combination is formed by the displayed symbols.

36. The method of claim 31, which includes repeating (b) to (d) until none of any winning symbol combinations are formed by the displayed symbols.

37. The method of claim 31, wherein said first row of symbol positions is positioned below the second row of symbol positions.

38. The method of claim 31, which includes, for a plurality of any winning symbol combinations formed by said displayed symbols:

(i) causing the at least one display device to display any award associated with the winning symbol combination, (ii) providing any displayed award associated with the winning symbol combination, (iii) causing the at least one processor to execute the plurality of instructions to cause the at least one processor to operate with the at least one display device to remove at least one of the displayed symbols which forms said winning symbol combination, (iv) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (v) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position.

39. The method of claim 31, which includes, for each of any winning symbol combinations formed by said displayed symbols:

(i) causing the at least one display device to display any award associated with the winning symbol combination, (ii) providing any displayed award associated with the winning symbol combination, (iii) causing the at least one processor to execute the plurality of instructions to cause the at least one processor to operate with the at least one display device to remove at least one of the displayed symbols which forms said winning symbol combination, (iv) for each of any symbols removed from the first row of the symbol positions, causing the at least one processor to execute the plurality of instructions to cause the at least one processor to operate with the at least one display device to reposition at least one of the displayed symbols to another one of the symbol positions to create at least one empty symbol position, and (v) for each of any symbols removed from the second row of the symbol positions, causing the at least one processor to execute the plurality of instructions to cause the at least one processor to operate with the at least one display device to reposition at least one of the displayed symbols to another one of the symbol positions to create at least one empty symbol position.

40. The method of claim 31, which is provided through a data network.

41. The method of claim 40, wherein the data network is an internet.

* * * * *

UNITED STATES PATENT AND TRADEMARK OFFICE

CERTIFICATE OF CORRECTION

PATENT NO. : 8,105,151 B2
APPLICATION NO. : 12/166462
DATED : January 31, 2012
INVENTOR(S) : Scott A. Caputo et al.

It is certified that error appears in the above-identified patent and that said Letters Patent is hereby corrected as shown below:

IN THE CLAIMS:

In Claim 1, Column 31, Line 21, after “symbols;” insert --and--.

Signed and Sealed this
Twenty-fourth Day of April, 2012

David J. Kappos
*Director of the United States Patent and Trademark Office*